US009381821B2

(12) United States Patent
Keeling et al.

(10) Patent No.: US 9,381,821 B2
(45) Date of Patent: Jul. 5, 2016

(54) SYSTEMS, METHODS, AND APPARATUS RELATED TO ELECTRIC VEHICLE WIRED AND WIRELESS CHARGING

(71) Applicant: QUALCOMM Incorporated, San Diego, CA (US)

(72) Inventors: Nicholas Athol Keeling, Auckland (NZ); Michael Le Gallais Kissin, Auckland (NZ); Jonathan Beaver, Auckland (NZ); Chang-Yu Huang, Auckland (NZ)

(73) Assignee: QUALCOMM INCORPORATED, San Diego, CA (US)

( * ) Notice: Subject to any disclaimer, the term of this patent is extended or adjusted under 35 U.S.C. 154(b) by 192 days.

(21) Appl. No.: 14/156,306

(22) Filed: Jan. 15, 2014

(65) Prior Publication Data

US 2014/0340027 A1 Nov. 20, 2014

Related U.S. Application Data

(60) Provisional application No. 61/823,858, filed on May 15, 2013.

(51) Int. Cl.
*B60L 11/18* (2006.01)
*H02J 3/18* (2006.01)
*H02M 7/00* (2006.01)

(52) U.S. Cl.
CPC ........... *B60L 11/182* (2013.01); *B60L 11/1816* (2013.01); *H02J 3/18* (2013.01); *H02M 7/00* (2013.01); *B60L 2270/147* (2013.01); *Y02E 40/30* (2013.01); *Y02T 10/7005* (2013.01); *Y02T10/7072* (2013.01); *Y02T 90/122* (2013.01); *Y02T 90/127* (2013.01); *Y02T 90/14* (2013.01)

(58) Field of Classification Search
CPC ...................................................... B60L 11/182
USPC .......................................................... 320/108
See application file for complete search history.

(56) References Cited

U.S. PATENT DOCUMENTS 4,891,569 A 1/1990 Light
5,563,781 A 10/1996 Clauter et al.
2011/0050164 A1 3/2011 Partovi et al.

(Continued)

FOREIGN PATENT DOCUMENTS

DE 102011003543 A1 8/2012
WO WO-2010129369 A2 11/2010

OTHER PUBLICATIONS

International Search Report and Written Opinion—PCT/US2014/037530—ISA/EPO—Aug. 20, 2014.

*Primary Examiner* — Thuan Do
(74) *Attorney, Agent, or Firm* — Knobbe, Martens, Olson & Bear, LLP

(57) ABSTRACT

One aspect provides an apparatus configured to receive wireless charging power and wired charging power. The apparatus includes a first rectifier configured to receive wired charging power and to provide a first rectified output. The apparatus further includes a second rectifier configured to receive wireless charging power and to provide a second rectified output. The apparatus further includes a power-factor correction (PFC) module configured to receive the first and second rectified outputs, and further configured to provide a power-factor corrected output. The apparatus further includes an isolated DC-DC converter configured to receive the power-factor corrected output and to provide an isolated DC output. The apparatus further includes and a battery configured to receive the isolated DC output.

26 Claims, 19 Drawing Sheets

(56) References Cited

U.S. PATENT DOCUMENTS

| | | |
|---|---|---|
| 2011/0156636 A1 | 6/2011 | Kim |
| 2011/0254379 A1* | 10/2011 | Madawala ............ H02J 5/005 307/104 |
| 2011/0291613 A1 | 12/2011 | Rosik et al. |
| 2012/0049794 A1 | 3/2012 | Han et al. |
| 2012/0229084 A1 | 9/2012 | Gu |
| 2013/0271069 A1 | 10/2013 | Partovi |

* cited by examiner

SYSTEMS, METHODS, AND APPARATUS RELATED TO ELECTRIC VEHICLE WIRED AND WIRELESS CHARGING

CROSS-REFERENCE TO RELATED APPLICATIONS

This application claims the benefit of U.S. Provisional Application No. 61/823,858, filed May 15, 2013, the entirety of which is incorporated herein by reference.

FIELD OF THE INVENTION

The present disclosure relates generally to wireless power transfer, and more specifically to devices, systems, and methods related to wired and wireless power transfer to remote systems such as vehicles including batteries.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions.

In some designs, an electric vehicle can be configured to receive charge through both a wired power supply and a wireless power supply. Various dual-source electric vehicles can receive wired and wireless power either alternately or simultaneously. As such, wireless charging systems and methods that efficiently and effectively facilitate reception, conditioning, and storage of wired and wireless power are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect provides an apparatus configured to receive wireless charging power and wired charging power. The apparatus includes a first rectifier configured to receive wired charging power and to provide a first rectified output. The apparatus further includes a second rectifier configured to receive wireless charging power and to provide a second rectified output. The apparatus further includes a power-factor correction (PFC) module configured to receive the first and second rectified outputs, and further configured to provide a power-factor corrected output. The apparatus further includes an isolated DC-DC converter configured to receive the power-factor corrected output and to provide an isolated DC output. The apparatus further includes and a battery configured to receive the isolated DC output.

Another aspect provides another apparatus configured to receive wireless charging power and wired charging power. The apparatus includes a first rectifier configured to receive wired charging power and to provide a first rectified output. The apparatus further includes a power-factor correction (PFC) module configured to receive the first rectified output from the electromagnetic interference (EMI) filter and rectifier, and further configured to provide a power-factor corrected output. The apparatus further includes an isolated DC-DC converter configured to receive the power-factor corrected output and to provide an isolated DC output. The apparatus further includes a coil configured to receive wireless charging power. The apparatus further includes a decoupling rectifier configured to receive the wireless charging power from the coil, to receive the isolated output, and to provide a second rectified output. The apparatus further includes and a battery configured to receive the second rectified output.

In various embodiments, the wireless charging power comprises a constant amplitude. In various embodiments, the apparatus can further include one or more of: a parallel tuning circuit configured to tune the coil, an electromagnetic interference (EMI) filter configured to filter the wired charging power, a bulk capacitance configured to filter the power-factor corrected output, and an output filter configured to filter the second rectified output.

Another aspect provides another apparatus configured to receive wireless charging power and wired charging power. The apparatus includes a first rectifier configured to receive wired charging power and to provide a first rectified output. The apparatus further includes a power-factor correction (PFC) module configured to receive the first rectified output from the electromagnetic interference (EMI) filter and rectifier, and further configured to provide a power-factor corrected output. The apparatus further includes a coil configured to receive wireless charging power. The apparatus further includes a parallel tuning circuit configured to tune the coil. The apparatus further includes a decoupling rectifier configured to receive the wireless charging power from the coil, and to provide a second rectified output. The apparatus further includes an output filter configured to filter the second rectified output and to provide a filtered output. The apparatus further includes an isolated DC-DC converter configured to receive the power-factor corrected output, to receive the filtered output, and to provide an isolated DC output. The apparatus further includes and a battery configured to receive the isolated DC output.

In various embodiments, the wireless charging power can include a constant amplitude. In various embodiments, the apparatus can further include one or more of: an electromagnetic interference (EMI) filter configured to filter the wired charging power, an output filter configured to filter the second rectified output, and a bulk capacitance configured to filter the power-factor corrected output and the second rectified output.

Another aspect provides another apparatus configured to receive wireless charging power and wired charging power. The apparatus includes a first rectifier configured to receive wired charging power and to provide a first rectified output.

The apparatus further includes a power-factor correction (PFC) module configured to receive the first rectified output from the electromagnetic interference (EMI) filter and rectifier, and further configured to provide a power-factor corrected output. The apparatus further includes a coil configured to receive wireless charging power. The apparatus further includes a series tuning circuit configured to tune the coil. The apparatus further includes a decoupling rectifier configured to receive the wireless charging power from the coil, and to provide a second rectified output. The apparatus further includes an isolated DC-DC converter configured to receive the power-factor corrected output, to receive the second rectified output, and to provide an isolated DC output. The apparatus further includes and a battery configured to receive the isolated DC output.

In various embodiments, the wireless charging power can include a constant amplitude. In various embodiments, the apparatus can further include one or more of: an electromagnetic interference (EMI) filter configured to filter the wired charging power, and a bulk capacitance configured to filter the power-factor corrected output and the second rectified output.

Another aspect provides another apparatus configured to receive wireless charging power and wired charging power. The apparatus includes a coil configured to receive wireless charging power. The apparatus further includes a parallel and partial series tuning circuit configured to tune the coil. The apparatus further includes a first rectifier configured to receive wired charging power, to receive the wireless charging power from the coil, and to provide a first rectified output. The apparatus further includes a power-factor correction (PFC) module configured to receive the first rectified output from the electromagnetic interference (EMI) filter and rectifier, and further configured to provide a power-factor corrected output. The apparatus further includes an isolated DC-DC converter configured to receive the power-factor corrected output, to receive the second rectified output, and to provide an isolated DC output. The apparatus further includes and a battery configured to receive the isolated DC output.

In various embodiments, the wireless charging power can include a constant amplitude. In various embodiments, the apparatus can further include one or more of: an electromagnetic interference (EMI) filter configured to filter the wired charging power, a fast switching controller associated with the PFC module, and a bulk capacitance configured to filter the power-factor corrected output.

Another aspect provides another apparatus configured to receive wireless charging power and wired charging power. The apparatus includes a first rectifier configured to receive wired charging power and to provide a first rectified output. The apparatus further includes a power-factor correction (PFC) module configured to receive the first rectified output from the electromagnetic interference (EMI) filter and rectifier, and further configured to provide a power-factor corrected output. The apparatus further includes a coil configured to receive wireless charging power. The apparatus further includes a decoupling rectifier configured to receive the wireless charging power from the coil, and to provide a second rectified output. The apparatus further includes a wave-shaping controller configured to shape the second rectified output and to provide a wave-shaped output. The apparatus further includes an isolated DC-DC converter configured to receive the power-factor corrected output, to receive the wave-shaped output, and to provide an isolated DC output. The apparatus further includes and a battery configured to receive the isolated DC output.

In various embodiments, the wireless charging power can include a modulated amplitude. In various embodiments, the apparatus can further include one or more of: an electromagnetic interference (EMI) filter configured to filter the wired charging power, a parallel tuning circuit configured to tune the coil, and a bulk capacitance configured to filter the power-factor corrected output and the wave-shaped output.

Another aspect provides another apparatus configured to receive wireless charging power and wired charging power. The apparatus includes a first rectifier configured to receive wired charging power and to provide a first rectified output. The apparatus further includes a coil configured to receive wireless charging power. The apparatus further includes a parallel tuning circuit configured to tune the coil. The apparatus further includes a decoupling rectifier configured to receive the wireless charging power from the coil, and to provide a second rectified output. The apparatus further includes a dual-mode power-factor correction (PFC) and wave-shaping module configured to receive the first rectified output and the second rectified output, and further configured to provide a power-factor corrected output. The apparatus further includes an isolated DC-DC converter configured to receive the power-factor corrected output, to receive the wave-shaped output, and to provide an isolated DC output. The apparatus further includes and a battery configured to receive the isolated DC output.

In various embodiments, the wireless charging power can include a modulated amplitude. In various embodiments, the apparatus can further include one or more of: an electromagnetic interference (EMI) filter configured to filter the wired charging power, and a bulk capacitance configured to filter the power-factor corrected output.

Another aspect provides another apparatus configured to receive wireless charging power and wired charging power. The apparatus includes a first rectifier configured to receive wired charging power and to provide a first rectified output. The apparatus further includes a coil configured to receive wireless charging power. The apparatus further includes a series tuning circuit configured to tune the coil. The apparatus further includes a decoupling rectifier configured to receive the wireless charging power from the coil, and to provide a second rectified output. The apparatus further includes a power-factor correction (PFC) module configured to receive the first rectified output and the second rectified output, and further configured to provide a power-factor corrected output. The apparatus further includes an isolated DC-DC converter configured to receive the power-factor corrected output, to receive the wave-shaped output, and to provide an isolated DC output. The apparatus further includes and a battery configured to receive the isolated DC output.

In various embodiments, the wireless charging power can include a modulated amplitude. In various embodiments, the apparatus can further include one or more of: an electromagnetic interference (EMI) filter configured to filter the wired charging power, and a bulk capacitance configured to filter the power-factor corrected output.

Another aspect provides another apparatus configured to receive wireless charging power and wired charging power. The apparatus includes a coil configured to receive wireless charging power. The apparatus further includes a series tuning circuit configured to tune the coil. The apparatus further includes a rectifier configured to receive wired charging power, to receive the wireless charging power from the coil, and to provide a first rectified output a power-factor correction (PFC) module configured to receive the first rectified output, and further configured to provide a power-factor corrected output. The apparatus further includes an isolated DC-DC converter configured to receive the power-factor corrected output, to receive the wave-shaped output, and to provide an isolated DC output. The apparatus further includes and a battery configured to receive the isolated DC output.

In various embodiments, the wireless charging power can include a modulated amplitude. In various embodiments, the apparatus can further include one or more of: an electromagnetic interference (EMI) filter configured to filter the wired charging power, and a bulk capacitance configured to filter the power-factor corrected output.

Another aspect provides another apparatus configured to receive wireless charging power and wired charging power. The apparatus includes a coil configured to receive wireless charging power. The apparatus further includes a parallel and partial series tuning circuit configured to tune the coil. The apparatus further includes a rectifier configured to receive wired charging power, to receive the wireless charging power from the coil, and to provide a first rectified output a dual-mode power-factor correction (PFC) and wave-shaping module configured to receive the first rectified output, and further configured to provide a power-factor corrected output. The apparatus further includes an isolated DC-DC converter configured to receive the power-factor corrected output, to receive the wave-shaped output, and to provide an isolated DC output. The apparatus further includes and a battery configured to receive the isolated DC output.

In various embodiments, the wireless charging power can include a modulated amplitude. In various embodiments, the apparatus can further include one or more of: an electromagnetic interference (EMI) filter configured to filter the wired charging power, and a bulk capacitance configured to filter the power-factor corrected output.

Another aspect provides another apparatus configured to receive wireless charging power and wired charging power. The apparatus includes a first rectifier configured to receive wired charging power and to provide a first rectified output. The apparatus further includes a low-energy isolated DC-DC converter configured to receive the first rectified output, and to provide an isolated DC output. The apparatus further includes a coil configured to receive wireless charging power. The apparatus further includes a series tuning circuit configured to tune the coil. The apparatus further includes a second rectifier configured to receive the wireless charging power from the coil, to receive the isolated DC output, and to provide a second rectified output. The apparatus further includes a current-source power-factor correction (PFC) module configured to receive the second rectified output, and further configured to provide a current-source output. The apparatus further includes and a battery configured to receive the current-source output.

In various embodiments, the wireless charging power can include a modulated amplitude. The apparatus can further include an electromagnetic interference (EMI) filter configured to filter the wired charging power.

Figure 1:
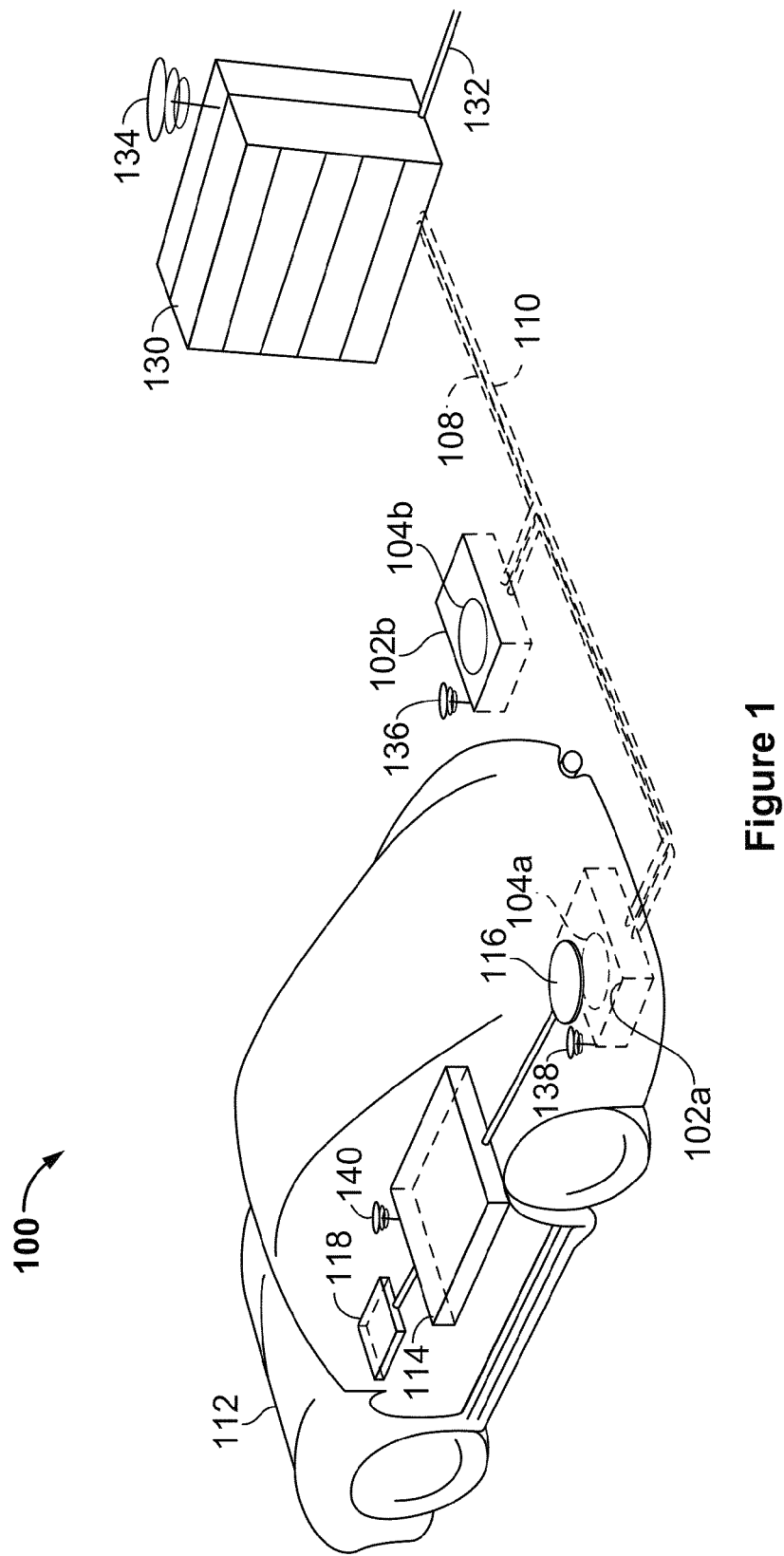
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power and an antenna 136. An electric vehicle 112 may include a battery unit 118, an electric vehicle induction coil 116, an electric vehicle wireless charging system 114, and an antenna 140. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112 (e.g., to charge the battery unit 118). In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution center 130 may be configured to communicate with external sources (e.g., a power grid) via a communication backhaul 134, and with the base wireless charging system 102a via a communication link 108.

Base wireless charging systems 102a and 102b may be configured to communicate with the electric vehicle wireless charging system 114 via antennas 136 and 138. For example, the wireless charging system 102a may communicate with the electric vehicle wireless charging system 114 using a communication channel between antennas 138 and 140. The communication channels may be any type of communication channels such as, for example, Bluetooth, zigbee, cellular, wireless local area network (WLAN), etc.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
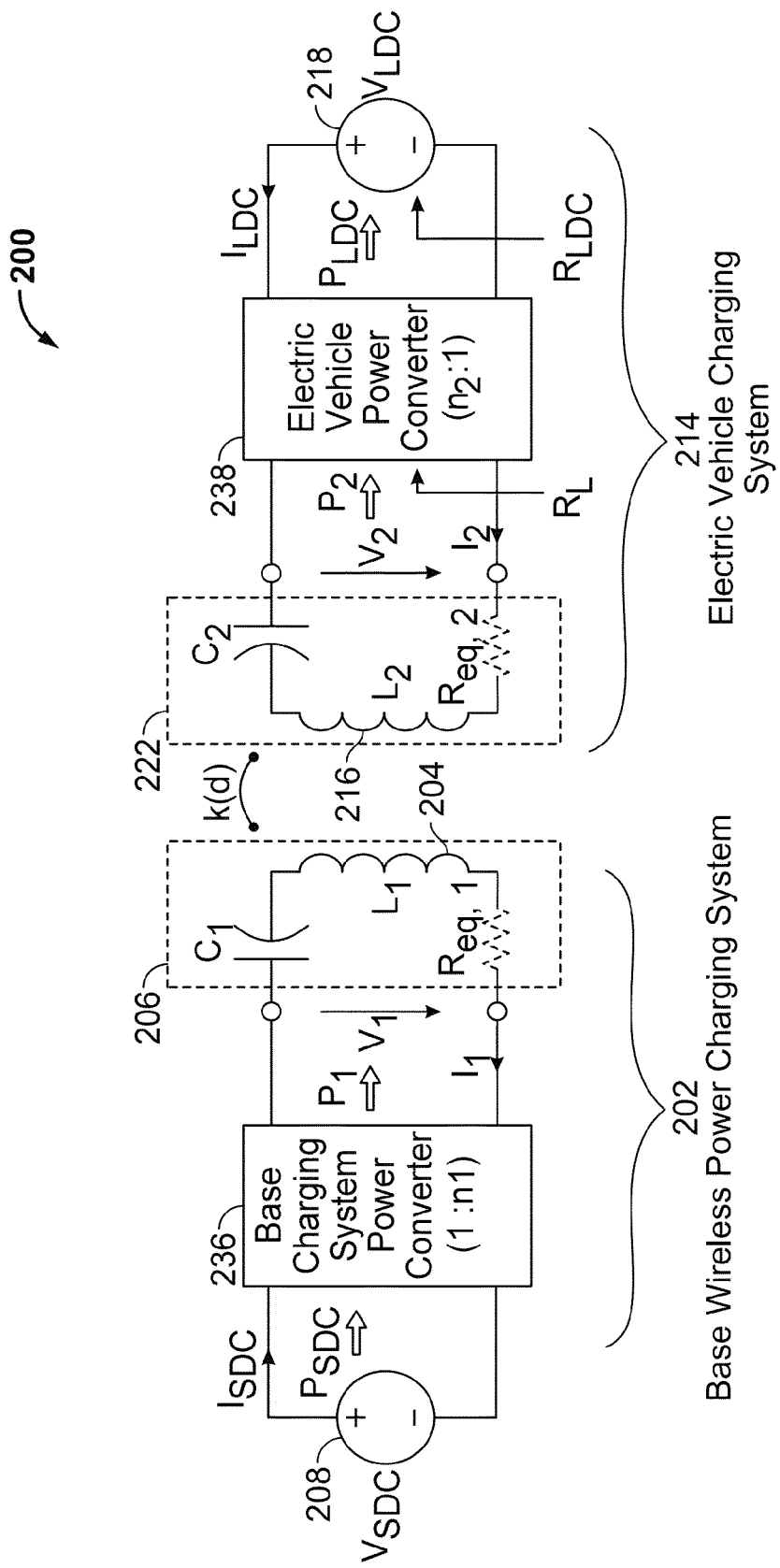
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
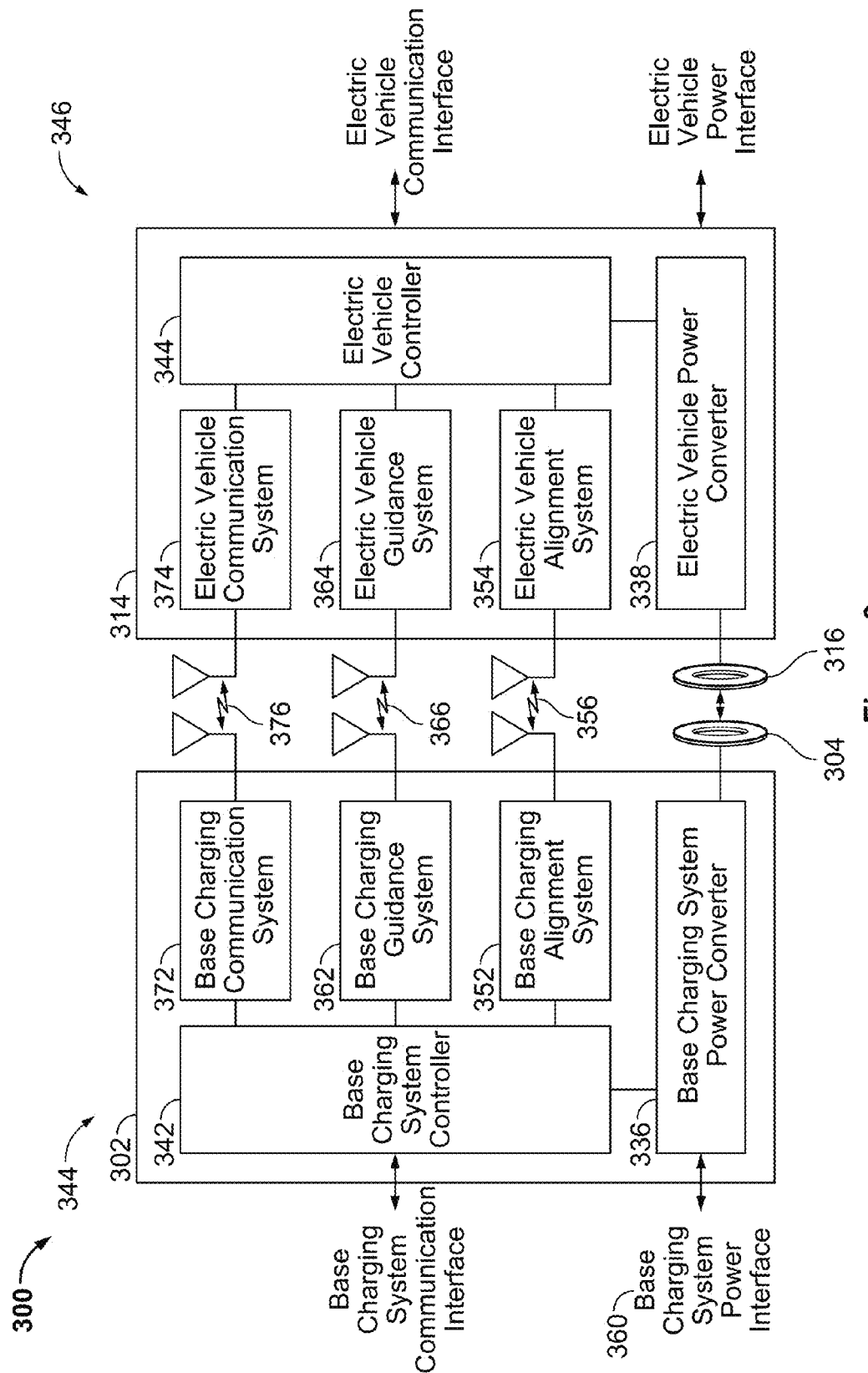
FIG. 3 is another functional block diagram showing exemplary core and ancillary components of the wireless power transfer system of FIG. 1.

FIG. 3 is another functional block diagram showing exemplary core and ancillary components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 may be configured to provide power to a charging system power converter 336 from a power source, such as an AC or DC power supply 126. The base charging system power converter 336 may receive AC or DC power from the base charging system power interface 360 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, a wireless device, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link 366 to provide a feedback mechanism to guide an operator in aligning the base system induction coil 304 and electric vehicle induction coil 316. In addition, there may be separate general-purpose communication links (e.g., channels), such as communication link 376, supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels may be separate physical communication channels such as, for example, Dedicated Short-Range Communications (DSRC), IEEE 802.11x (e.g., Wi-Fi), Bluetooth, zigbee, cellular, infrared, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-added services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

The wireless power transfer system 100 described may be used with a variety of electric vehicles 102 including rechargeable or replaceable batteries.

Figure 4:
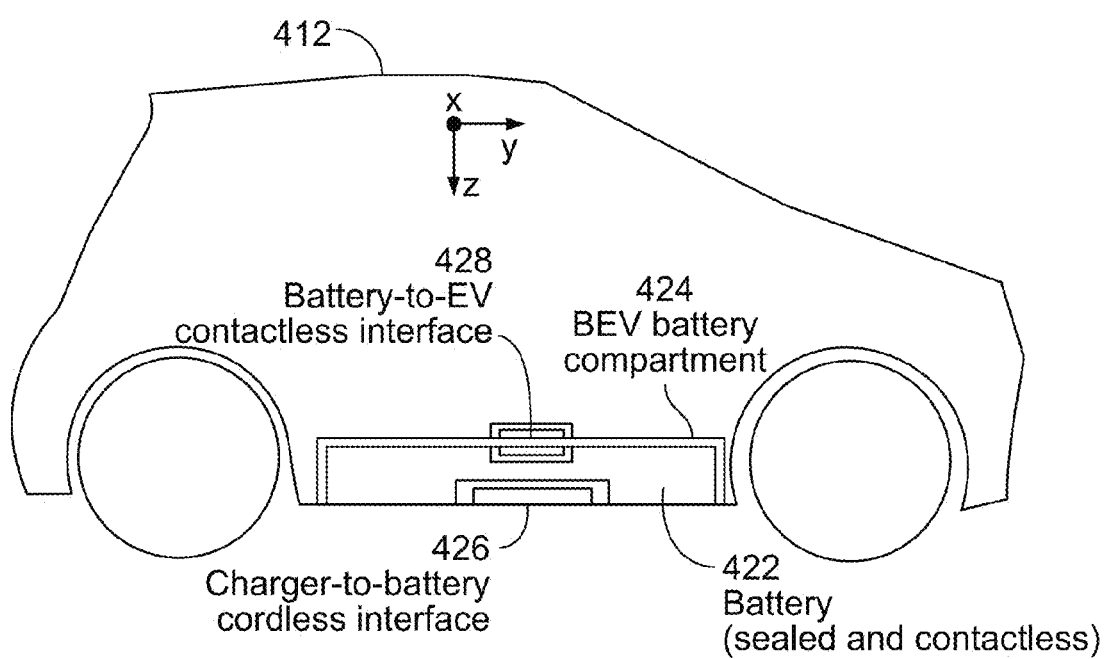
FIG. 4 is a functional block diagram showing a replaceable contactless battery disposed in an electric vehicle, in accordance with an exemplary embodiment of the invention.

FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
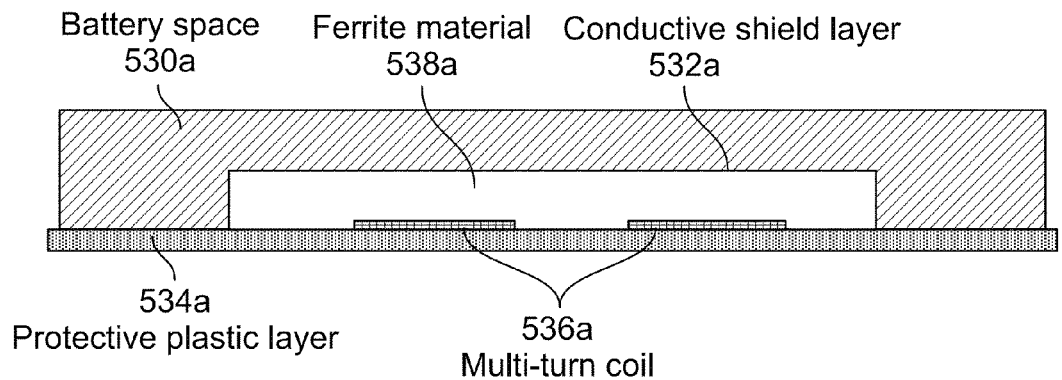
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield layer 532a may be provided to protect passengers of the vehicle from excessive EMF transmission. Conductive shielding may be particularly useful in vehicles made of plastic or composites.

Figure 5B:
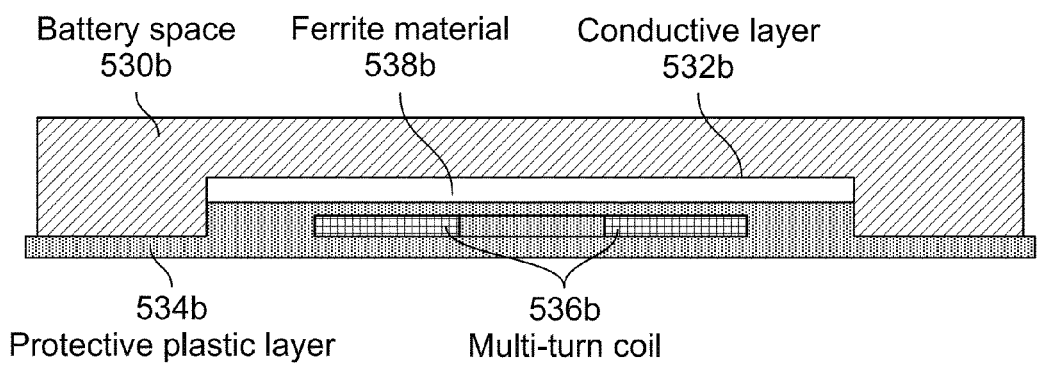

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
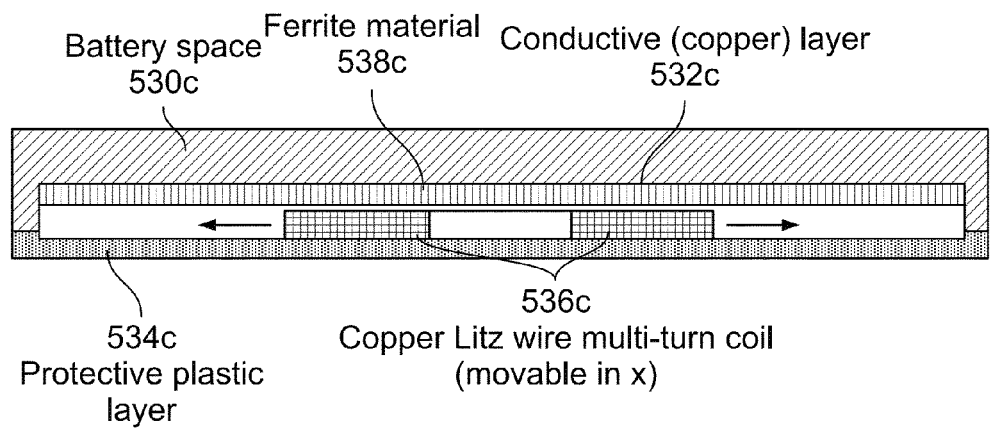
Figure 5D:
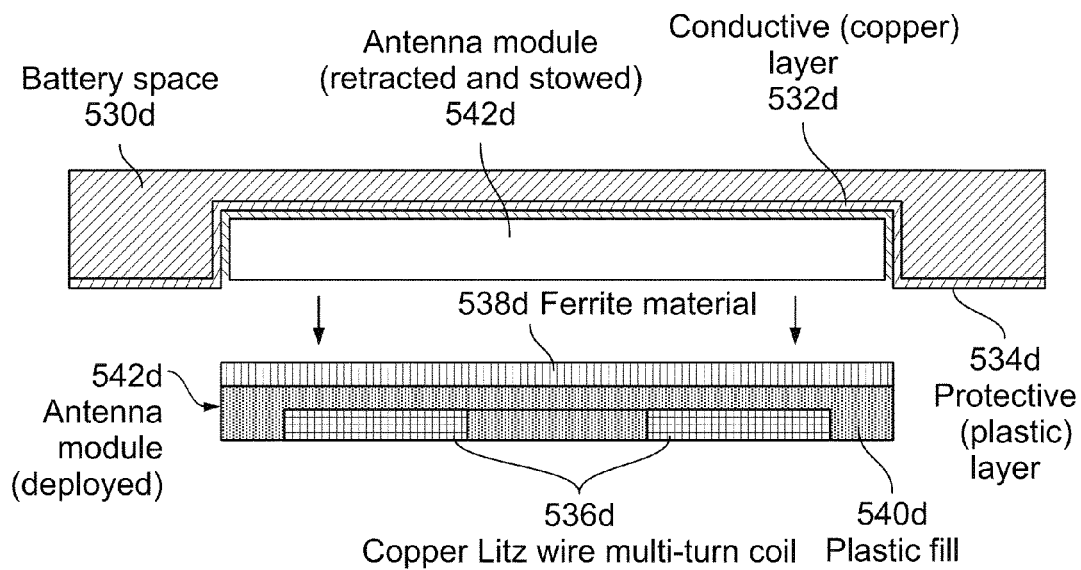

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 542d as part of the wireless power interface. To prevent magnetic fields from penetrating into the battery space 530d and into the interior of the vehicle, there may be a conductive layer shield 532d (e.g., a copper sheet) between the battery space 530d and the vehicle. Furthermore, a non-conductive (e.g., plastic) protective layer 534d may be used to protect the conductive layer shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542d is similar to that of FIG. 5B except there is no conductive shielding at the electric vehicle induction coil module 542d. The conductive shield 532d stays with the battery unit body. The protective layer 534d (e.g., plastic layer) is provided between the conductive shield 532d and the electric vehicle induction coil module 542d when the electric vehicle induction coil module 542d is not in a deployed state. The physical separation of the electric vehicle induction coil module 542d from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive layer shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
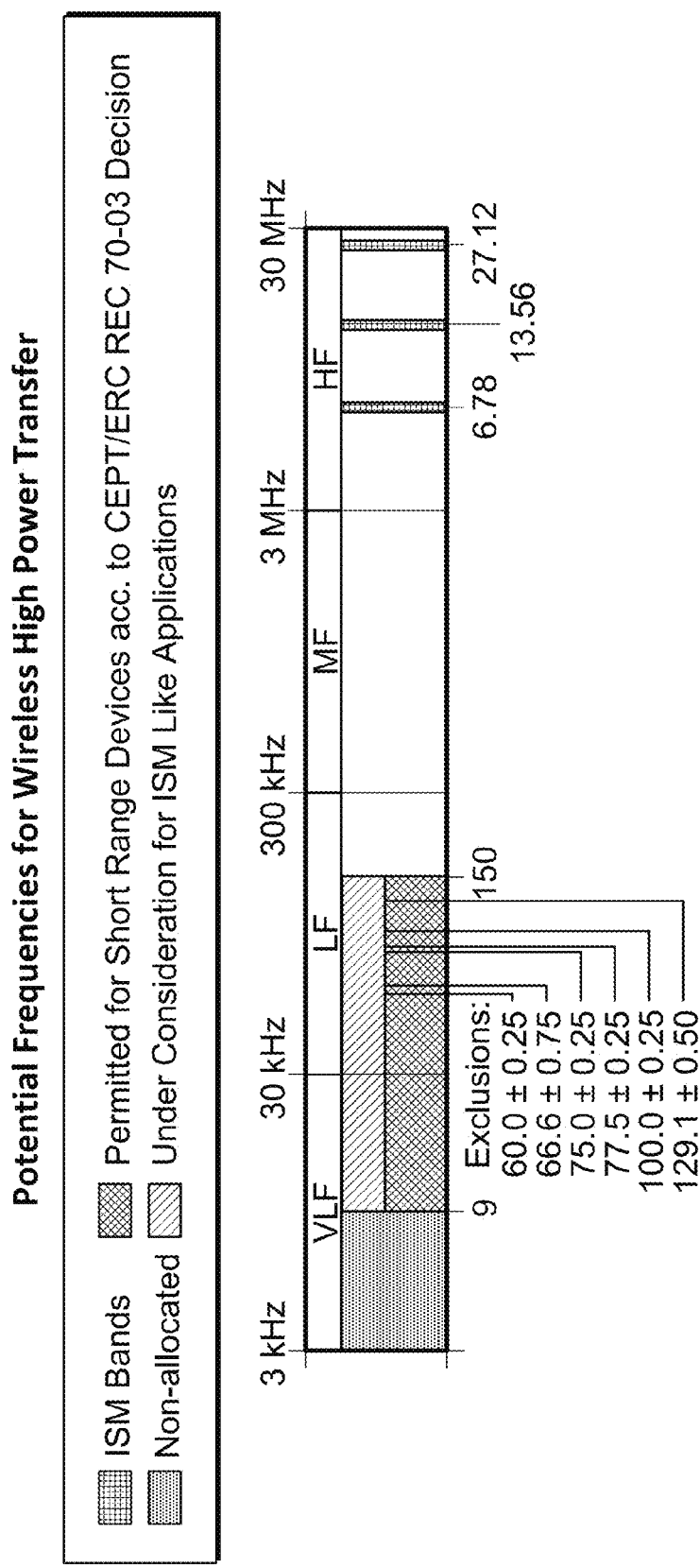
FIG. 6 is a chart of a frequency spectrum showing exemplary frequencies that may be used for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
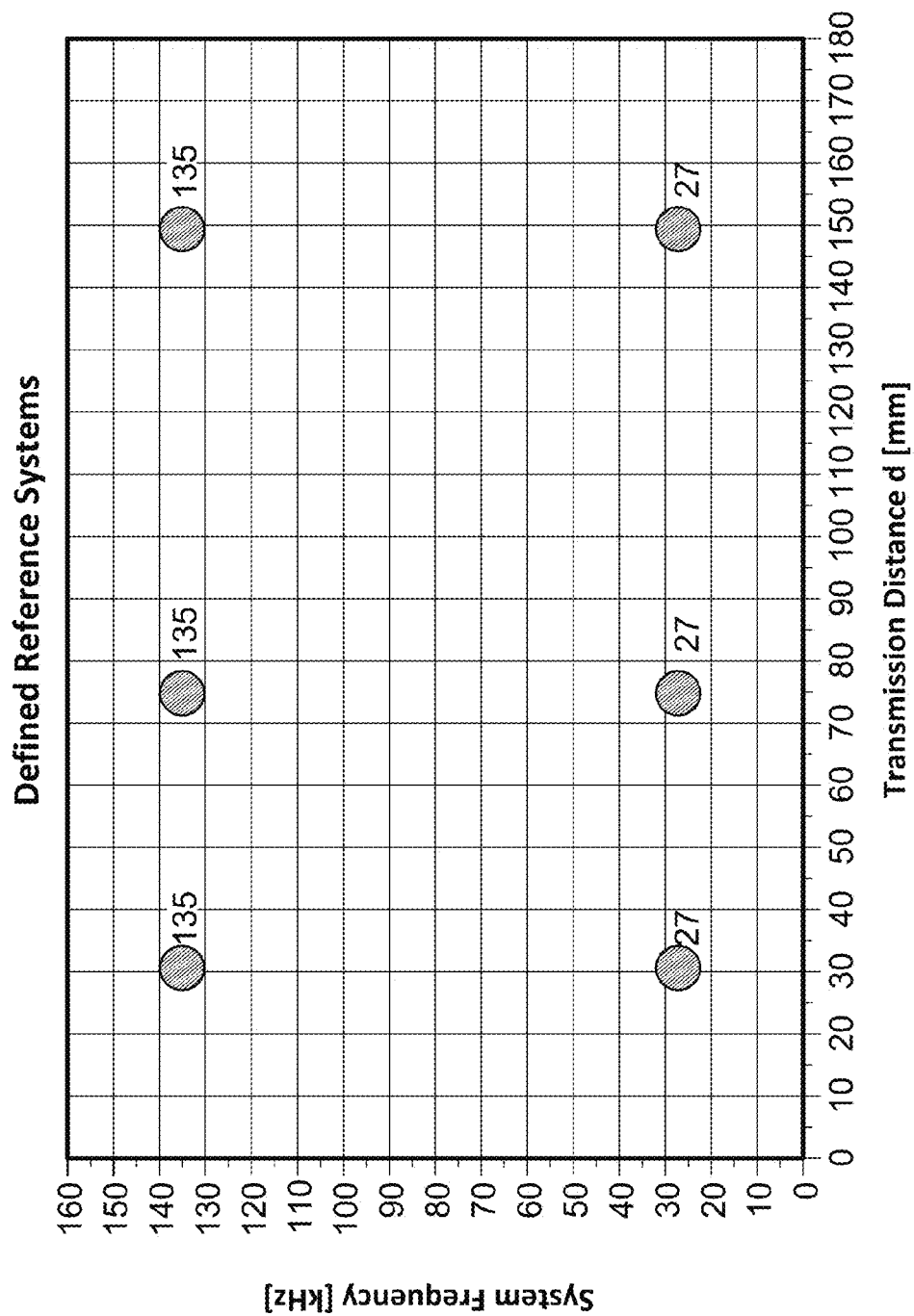
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of an electric vehicle, a Base Charging Unit (BCU) of the wireless power transfer system may go through various states of operation. The wireless power transfer system may be referred to as a "charging system." The BCU may include the base wireless charging system 102a and/or 102b of FIG. 1. The BCU may also include a controller and/or a power conversion unit, such as power converter 236 as illustrated in FIG. 2. Further, the BCU may include one or more base charging pads that include an induction coil, such as induction coils 104a and 104b as illustrated in FIG. 1. As the BCU goes through the various states, the BCU interacts with a charging station. The charging station may include the local distribution center 130, as illustrated in FIG. 1, and may further include a controller, a graphical user interface, a communications module, and a network connection to a remote server or group of servers.

With reference to FIG. 1, the wireless charging systems described above may be used in combination with a wired charging system. For example, the electric vehicle 112 can be configured to receive power via a wired connector. A power transfer system including both wired and wireless charging systems can be referred to herein as a dual-source power transfer system. In the example embodiments described below associated with FIGS. 8-18, an infrastructure side may transfer power to a vehicle side capable only of a wired connection or to a vehicle side capable of only a wireless connection, or a vehicle side capable of both a wired connection or a wireless connection. In certain embodiments, a vehicle side may be capable of receiving power from an infrastructure side capable of power transfer only through a wired connection, or an infrastructure side capable of power transfer only through a wired connection, or an infrastructure side capable of power transfer either via a wired connection or a wireless connection or both.

Figure 8:
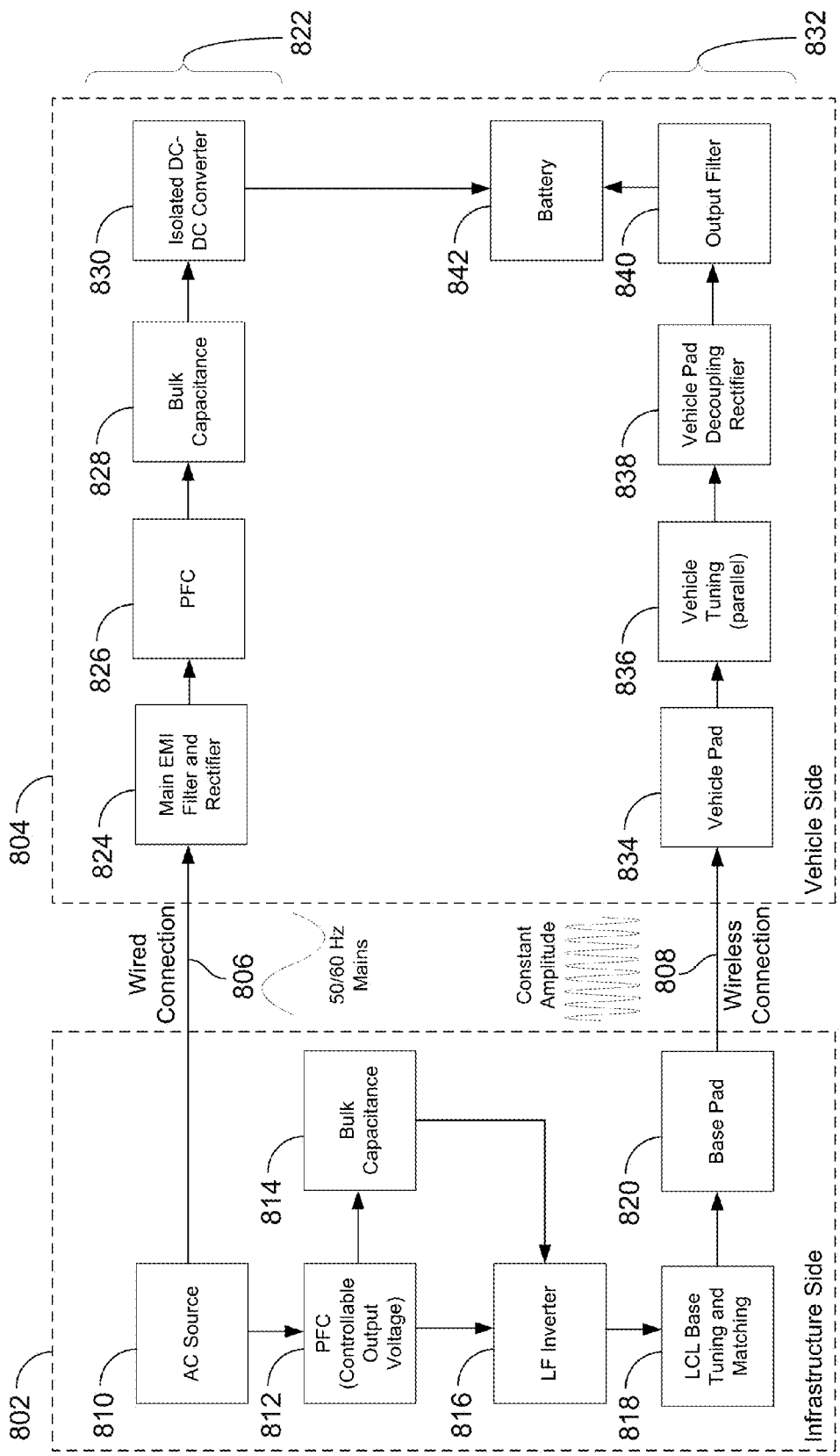
FIG. 8 is a functional block diagram showing exemplary components of a dual-source power transfer system.

FIG. 8 is a functional block diagram showing exemplary components of a dual-source power transfer system 800. The dual-source power transfer system 800 includes an infrastructure side 802 and a vehicle side 804, wherein power can be transferred from the infrastructure side 802 to the vehicle side 804 via a wired connection 806 or a wireless connection 808, or both. In some embodiments, the wired connection 806 can include a 50/60 Hz AC mains signal. The wireless connection 808 can include a constant amplitude inductive charging field. Although various aspects of the infrastructure side 802 and the vehicle side 804 may be discussed herein as cohesive units, a person having ordinary skill in the art will appreciate that either of the infrastructure side 802 and the vehicle side 804 can be divided into one or more separate components or subsystems, and individual components or subsystems discussed can be implemented separately or can be integrated.

The infrastructure side 802 serves to provide charging power, via the wired connection 806 and/or the wireless connection 808, to the vehicle side 804. As shown in FIG. 8, the infrastructure side 804 includes an AC power source 810, a power-factor correction (PFC) unit 812, a bulk capacitance 814, a low-frequency (LF) inverter 816, an LCL base tuning and matching unit 818, and a base pad 820. In various embodiments, the infrastructure side 802 can include one or more components of the wireless power transfer system 100, described above with respect to FIG. 1. For example, the infrastructure side 802 can include the local distribution center 130 and the base wireless charging system 102a. The infrastructure side 802 can be configured to transmit wireless charging power, via the wireless connection 808, as described above with respect to FIGS. 2-3. Although certain exemplary components are shown in FIG. 8, a person having ordinary skill in the art will appreciate that certain components can be added, omitted, and/or reordered.

The AC source 810 serves to provide AC power to the wired connection 806, and to one or more components driving the wireless connection 808. As shown, the AC source 810 provides power to the PFC unit 812. The AC source 810 can include, for example, the local distribution center 130 (FIG. 1) and/or the power backbone 132 (FIG. 1). In some embodiments, the source 810 can include a DC source.

The PFC unit 812 serves to reduce harmonic content in currents of the AC source 810. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In various embodiments, the PFC unit 812 can include active or passive PFC. In some embodiments, the PFC unit 812 can be configured to control an output voltage. As shown, the PFC unit 812 drives the bulk capacitance 814 and the LF inverter 816.

The bulk capacitance 814 serves to smooth the waveform entering the LF inverter 816 and to counteract inductive effects of other components. In various embodiments, the bulk capacitance 814 can be incorporated into the PFC unit 812 and/or the LF inverter 816.

The LF inverter 816 serves to generate the low-frequency signal for inductive field generation. In an embodiment, the LF inverter 816 can be referred to as an LF converter. In various embodiments, the LF inverter 816 can receive a signal from the PFC unit 812 and output a low-frequency signal to the LCL base tuning and matching unit 818.

The LCL base tuning and matching unit 818 serves to filter out harmonics or other unwanted frequencies and match the impedance of the LF inverter 816 to a wireless power induction coil. As shown, the LCL base tuning and matching unit 818 is configured to receive the LF signal from the LF inverter 816, and to output tuned/matched signal to the base pad 820.

The base pad 820 serves to transmit wireless charging power, via the wireless connection 808, to the vehicle side 804. In some embodiments, the base pad 820 can include the base induction coil 304 (FIG. 3). As shown, the base pad 820 receives the tuned/matched LF signal through the LCL base tuning and matching circuit 818 and generates the wireless charging field for the wireless connection 808. In some embodiments, the base pad 820 can include transmit circuitry configured to provide the constant-amplitude wireless connection 808 to the vehicle side 804 as described above with respect to FIGS. 1-3.

The vehicle side 804 serves to receive charging power, via the wired connection 806 and/or the wireless connection 808, from the infrastructure side 802. As shown in FIG. 8, the vehicle side 804 includes a wired path 822 including a main electromagnetic interference (EMI) filter and rectifier 824, a PFC unit 826, a bulk capacitance 828, and an isolated DC-DC converter 830. The vehicle side 804 further includes a wireless path 832 including a vehicle pad 834, a vehicle tuning circuit 836, a vehicle pad decoupling rectifier 838, and an output filter 840. Both the wired path 822 and the wireless path 832 feed power into the battery 842.

In various embodiments, the vehicle side 804 can include one or more components of the wireless power transfer system 100, described above with respect to FIG. 1. For example, the vehicle side 804 can include the battery unit 118, the electric vehicle induction coil 116, the electric vehicle wireless charging system 114, and the antenna 140. The vehicle side 804 can be configured to receive wireless charging power, via the wireless connection 808, as described above with respect to FIGS. 1-3. Although certain exemplary components are shown in FIG. 8, a person having ordinary skill in the art will appreciate that certain components can be added, omitted, and/or reordered.

In the wired path 822, the main EMI filter and rectifier 824 serves to rectify the incoming wired connection 806 and to filter frequencies caused by rectification (or other causes) that can emit unwanted electromagnetic interference. As shown, the main EMI filter and rectifier 824 receives an AC signal via the wired connection 806 and provides a rectified signal to the PFC unit 826.

The PFC unit 826 serves to reduce harmonic content in currents of the AC source 810. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. As shown, the PFC unit 826 receives the signal from the main EMI filter and rectifier 824, and provides the bulk capacitance 828 with a power-factor corrected signal.

The bulk capacitance 828 serves to smooth the signal entering the isolated DC-DC converter 830 and to counteract inductive effects of other components. In various embodiments, the bulk capacitance 828 can be incorporated into the PFC unit 826 and/or the isolated DC-DC converter 830.

The DC-DC converter 830 serves to isolate the battery 842 from the mains power from the AC source 810. The DC-DC converter 830 can include, for example, a pair of inductive coils. In various embodiments, the DC-DC converter 830 can be configured to adjust a voltage level coming from the wired connection 806, as appropriate for charging the battery 842.

In the wireless path 832, the vehicle pad 834 is configured to receive wireless charging power, via the wireless connection 808, from the infrastructure side 802. In some embodiments, the vehicle pad 834 can include the electric vehicle induction coil 316 (FIG. 3). As shown, the vehicle pad 834 receives the wireless charging field from the wireless connection 808 and provides an output signal to the parallel vehicle tuning module 836.

The vehicle tuning circuit 836 serves to tune the impedance of the wireless path 832 for efficient wireless power transfer. In the illustrated embodiment, the vehicle tuning circuit 836 is configured as a parallel LC circuit. In other embodiments, the vehicle tuning circuit 836 can be configured as a series LC circuit. As shown, the vehicle tuning circuit 836 receives an input signal from the vehicle pad 834 and provides an output signal to the vehicle pad decoupling rectifier 838.

The vehicle pad decoupling rectifier 838 serves to provide rectified power from an LF signal. The vehicle pad decoupling rectifier 838 can generate the rectified signal via rectification. As shown, the decoupling rectifier 838 receives the LF input signal from the vehicle tuning circuit 836, and provides a rectified power output to the output filter 840.

The output filter 840 serves to filter frequencies caused by rectification (or other causes) that can emit unwanted electromagnetic interference, and to otherwise smooth the output from the vehicle pad decoupling rectifier 838. As shown, the output filter 840 receives the signal from the vehicle pad decoupling rectifier 838 and provides a filtered output signal to the battery 842.

In the embodiment of FIG. 8, various components in the wired path 822 and the wireless path 832 of the vehicle side 804, as well as the infrastructure side 802, may serve duplicative or overlapping functions. In some embodiments, components in the wired path 822 can be used in the wireless path 832, and vice versa. For example, both the wired path 822 and the wireless path 832 include rectifiers, filters, etc. Similarly, the infrastructure side 802 and the vehicle side 804 both include PFC units, the bulk capacitances, tuning and matching circuits, etc. As will be discussed herein with respect to FIGS. 9-18, in various embodiments, one or more aspects of the wired path 822 and the wireless path 832 can be combined, shared, or otherwise merged.

In one embodiment, described in greater detail below with respect to FIG. 9, the wired path 822 and the wireless path 832 can share the decoupling rectifier 838 and the output filter 840. In some embodiments, this configuration can reduce overall cost. In some embodiments, this configuration can increase cost, and/or reduce efficiency, for the wired path 822.

In one embodiment, described in greater detail below with respect to FIG. 10, the wired path 822 and the wireless path 832 can share the bulk capacitance 828 and the isolated DC-DC converter 830. In some embodiments, this configuration can reduce or eliminate battery variation, thereby increasing an average efficiency and/or tolerance in the wireless path 832. In some embodiments, a higher voltage can be used. In some embodiments, this configuration can reduce a peak efficiency of the wireless path 832.

In one embodiment, described in greater detail below with respect to FIG. 11, the wired path 822 and the wireless path 832 can share the bulk capacitance 828 and the isolated DC-DC converter 830. Moreover, the vehicle tuning circuit 836 can include a series configuration. Accordingly, the output filter 840 can be omitted. In some embodiments, this configuration can reduce or eliminate battery variation, thereby increasing an average efficiency and/or tolerance in the wireless path 832. In some embodiments, this configuration can reduce a production cost for the wireless path 832. In some embodiments, a higher voltage can be used. In some embodiments, this configuration can reduce a peak efficiency of the wireless path 832. Moreover, the configuration may subject the bulk capacitance 828 to wireless charger ripple current and inrush current.

In one embodiment, described in greater detail below with respect to FIG. 11, the wired path 822 and the wireless path 832 can share the bulk capacitance 828 and the isolated DC-DC converter 830. Moreover, the vehicle tuning circuit 836 can include a series configuration. Accordingly, the output filter 840 can be omitted. In some embodiments, this configuration can reduce or eliminate battery variation, thereby increasing an average efficiency and/or tolerance in the wireless path 832. In some embodiments, this configuration can reduce a production cost for the wireless path 832. In some embodiments, a higher voltage can be used. In some embodiments, this configuration can reduce a peak efficiency of the wireless path 832. Moreover, the configuration may subject the bulk capacitance 828 to wireless charger ripple current and inrush current.

In one embodiment, described in greater detail below with respect to FIG. 12, the wired path 822 and the wireless path 832 can share the main EMI filter and rectifier 824, the PFC unit 826, the bulk capacitance 828 and the isolated DC-DC converter 830. Moreover, the vehicle tuning circuit 836 can include a parallel with partial series configuration. Accordingly, the output filter 840 and the vehicle pad decoupling rectifier 838 can be omitted. In some embodiments, this configuration can reduce an overall production cost and can increase tolerance and/or robustness in the wireless system. In some embodiments, a higher voltage can be used. In some embodiments, this configuration can reduce a peak efficiency of the wireless path 832. In some embodiments, the PFC unit 826 can include a fast switching controller, thereby increasing complexity.

In one embodiment, described in greater detail below with respect to FIG. 13, the PFC unit 812 can be replaced with a rectifier and low energy bus. Thus, the infrastructure side 802 can be configured to generate a modulated amplitude wireless field. The wired path 822 and the wireless path 832 can share the bulk capacitance 828 and the isolated DC-DC converter 830. The output filter 840 can be replaced with a wave shaping controller. In some embodiments, this configuration can reduce an overall infrastructure production cost and can increase tolerance to coupling variation. In some embodiments, a higher voltage can be used. In some embodiments, this configuration can reduce an efficiency of the wireless path 832. Moreover, the configuration may subject the bulk capacitance 828 to wireless charger ripple current and inrush current, increase emissions, and/or increase pad losses.

In one embodiment, described in greater detail below with respect to FIG. 14, the PFC unit 812 can be replaced with a rectifier and low energy bus. Thus, the infrastructure side 802 can be configured to generate a modulated amplitude wireless field. The wired path 822 and the wireless path 832 can share a dual-mode PFC and waveshaping controller, the bulk capacitance 828, and the isolated DC-DC converter 830. Thus, the output filter 840 can be omitted. In some embodiments, this configuration can reduce an overall infrastructure and wireless path 832 production cost, and can increase tolerance to coupling variation. In some embodiments, a higher voltage can be used. In some embodiments, this configuration can reduce an efficiency of the wireless path 832. Moreover, the configuration may increase emissions, and/or increase pad losses. The dual-mode PFC and waveshaping controller can add complexity.

In one embodiment, described in greater detail below with respect to FIG. 15, the PFC unit 812 can be replaced with a rectifier and low energy bus. Thus, the infrastructure side 802 can be configured to generate a modulated amplitude wireless field. The wired path 822 and the wireless path 832 can share the PFC unit 826, the bulk capacitance 828, and the isolated DC-DC converter 830. Moreover, the vehicle tuning circuit 836 can include a series configuration. Thus, the output filter 840 can be omitted. In some embodiments, this configuration can reduce an overall infrastructure and wireless path 832 production cost, and can increase tolerance to coupling variation. In some embodiments, a higher voltage can be used. In some embodiments, this configuration can reduce an efficiency of the wireless path 832. Moreover, the configuration may increase emissions, and/or increase pad losses.

In one embodiment, described in greater detail below with respect to FIG. 16, the PFC unit 812 can be replaced with a rectifier and low energy bus. Thus, the infrastructure side 802 can be configured to generate a modulated amplitude wireless field. The wired path 822 and the wireless path 832 can share the rectifier and filter 838, the PFC unit 826, the bulk capacitance 828, and the isolated DC-DC converter 830. Moreover, the vehicle tuning circuit 836 can include a series configuration. Thus, the output filter 840 can be omitted. In some embodiments, this configuration can reduce an overall infrastructure and wireless path 832 production cost, and can increase tolerance to coupling variation. In some embodiments, a higher voltage can be used. In some embodiments, this configuration can reduce an efficiency of the wireless path 832. Moreover, the configuration may increase emissions, and/or increase pad losses. The rectifier 1638 can be modified to handle both low-frequency (LF) and AC signals.

In one embodiment, described in greater detail below with respect to FIG. 17, the PFC unit 812 can be replaced with a rectifier and low energy bus. Thus, the infrastructure side 802 can be configured to generate a modulated amplitude wireless field. The wired path 822 and the wireless path 832 can share the rectifier and filter 1638, a dual-mode PFC and waveshaping controller, the bulk capacitance 828, and the isolated DC-DC converter 830. Moreover, the vehicle tuning circuit 836 can include a parallel with partial series configuration. Thus, the output filter 840 can be omitted. In some embodiments, this configuration can reduce an overall infrastructure and wireless path 832 production cost, and can increase tolerance to coupling variation. In some embodiments, a higher voltage can be used. In some embodiments, this configuration can reduce an efficiency of the wireless path 832. Moreover, the configuration may increase emissions, and/or increase pad losses. The dual-mode PFC and waveshaping controller can add complexity.

In one embodiment, described in greater detail below with respect to FIG. 18, the PFC unit 812 can be replaced with a rectifier and low energy bus. Thus, the infrastructure side 802 can be configured to generate a modulated amplitude wireless field. The wired path 822 and the wireless path 832 can share the rectifier and filter 1638 and a current-source output PFC. The isolated DC-DC converter 830 can be replaced with a low-energy isolated DC-DC converter. Thus, the output filter 840 and the bulk capacitance 828 can be omitted.

Figure 9:
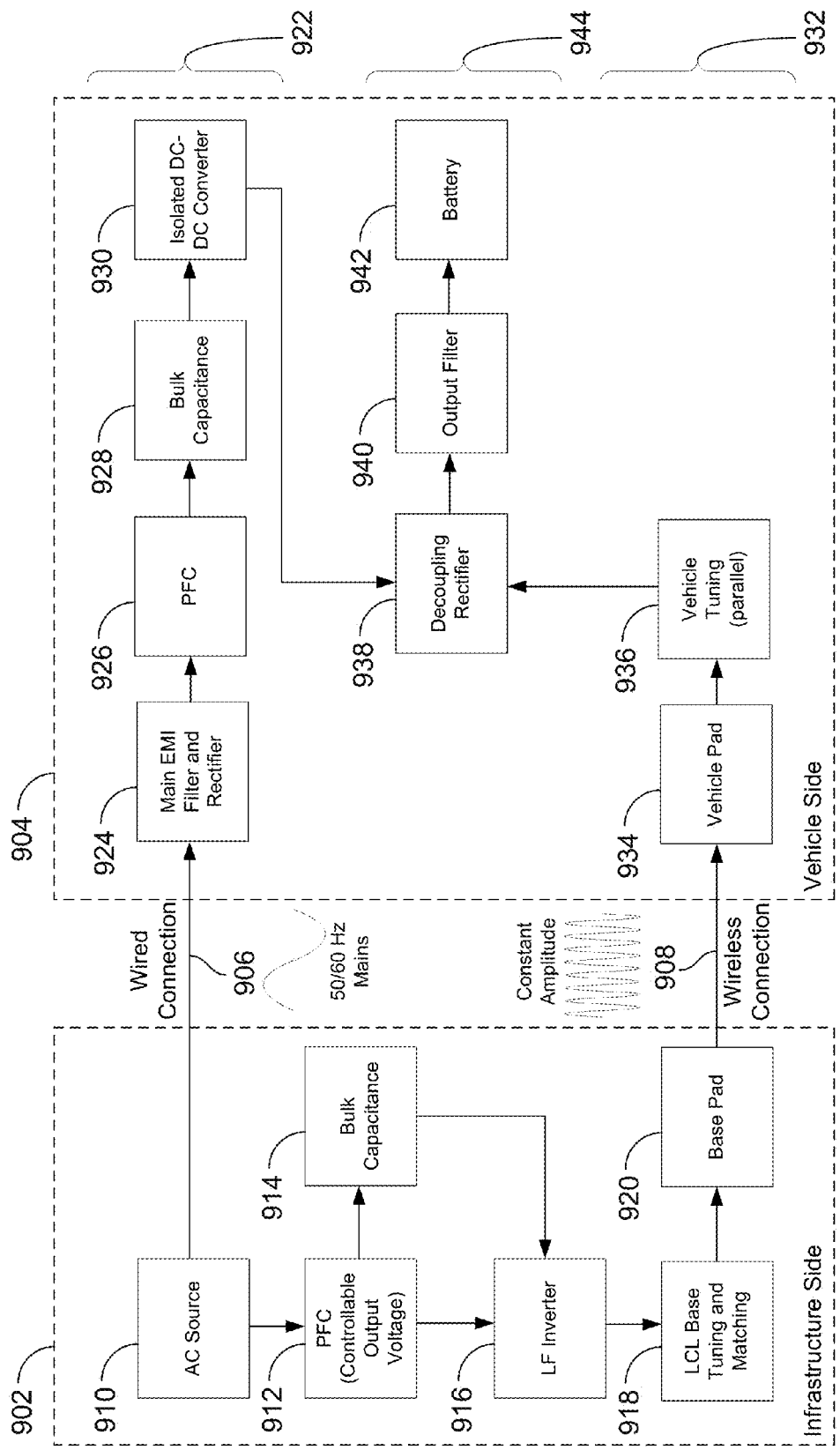
FIG. 9 is a functional block diagram showing exemplary components of another dual-source power transfer system.

FIG. 9 is a functional block diagram showing exemplary components of another dual-source power transfer system 900. The dual-source power transfer system 900 includes an infrastructure side 902 and a vehicle side 904, wherein power can be transferred from the infrastructure side 902 to the vehicle side 904 via a wired connection 906 or a wireless connection 908 connected by a wired connection 906 and a wireless connection 908, or both. In some embodiments, the wired connection 906 can include a 50/60 Hz AC mains signal. The wireless connection 908 can include a constant amplitude inductive charging field. Although various aspects of the infrastructure side 902 and the vehicle side 904 may be discussed herein as cohesive units, a person having ordinary skill in the art will appreciate that either of the infrastructure side 902 and the vehicle side 904 can be divided into one or more separate components or subsystems, and individual components or subsystems discussed can be implemented separately or can be integrated.

The infrastructure side 902 serves to provide charging power, via the wired connection 906 and/or the wireless connection 908, to the vehicle side 904. As shown in FIG. 9, the infrastructure side 904 includes an AC power source 910, a power-factor correction (PFC) unit 912, a bulk capacitance 914, a low-frequency (LF) inverter 916, an LCL base tuning and matching unit 918, and a base pad 920. In various embodiments, the infrastructure side 902 can include one or more components of the wireless power transfer system 100, described above with respect to FIG. 1. For example, the infrastructure side 902 can include the local distribution center 130 and the base wireless charging system 102a. The infrastructure side 902 can be configured to transmit wireless charging power, via the wireless connection 908, as described above with respect to FIGS. 2-3. Although certain exemplary components are shown in FIG. 9, a person having ordinary skill in the art will appreciate that certain components can be added, omitted, and/or reordered.

The AC source 910 serves to provide AC power to the wired connection 906, and to one or more components driving the wireless connection 908. As shown, the AC source 910 provides power to the PFC unit 912. The AC source 910 can include, for example, the local distribution center 130 (FIG. 1) and/or the power backbone 132 (FIG. 1). In some embodiments, the source 910 can include a DC source.

The PFC unit 912 serves to reduce harmonic content in currents of the AC source 910. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In various embodiments, the PFC unit 912 can include active or passive PFC. In some embodiments, the PFC unit 912 can be configured to control an output voltage. As shown, the PFC unit 912 drives the bulk capacitance 914 and the LF inverter 916.

The bulk capacitance 914 serves to smooth the waveform entering the LF inverter 916 and to counteract inductive effects of other components. In various embodiments, the bulk capacitance 914 can be incorporated into the PFC unit 912 and/or the LF inverter 916.

The LF inverter 916 serves to generate the low-frequency signal for inductive field generation. In an embodiment, the LF inverter 916 can be referred to as an LF converter. In various embodiments, the LF inverter 916 can receive a signal from the PFC unit 912 and output a low-frequency signal to the LCL base tuning and matching unit 918.

The LCL base tuning and matching unit 918 serves to filter out harmonics or other unwanted frequencies and match the impedance of the LF inverter 916 to a wireless power induction coil. As shown, the LCL base tuning and matching unit 918 is configured to receive the LF signal from the LF inverter 916, and to output tuned/matched signal to the base pad 920.

The base pad 920 serves to transmit wireless charging power, via the wireless connection 908, to the vehicle side 904. In some embodiments, the base pad 920 can include the base induction coil 304 (FIG. 3). As shown, the base pad 920 receives the tuned/matched LF signal through the LCL base tuning and matching circuit 918 and generates the wireless charging field for the wireless connection 908. In some embodiments, the base pad 920 can include transmit circuitry configured to provide the constant-amplitude wireless connection 908 to the vehicle side 904 as described above with respect to FIGS. 1-3.

The vehicle side 904 serves to receive charging power, via the wired connection 906 and/or the wireless connection 908, from the infrastructure side 902. As shown in FIG. 9, the vehicle side 904 includes a wired path 922 including a main electromagnetic interference (EMI) filter and rectifier 924, a PFC unit 926, a bulk capacitance 928, and an isolated DC-DC converter 930. The vehicle side 904 further includes a wireless path 932 including a vehicle pad 934, and a vehicle tuning circuit 936. The vehicle side 904 further includes a combined path 944 including a decoupling rectifier 938, an output filter 940, and the battery 942.

In various embodiments, the wired path 922, the wireless path 932, or both, can be active at any given time. Thus, although various components in the combined path 944 can be described herein as receiving power from more than once source, in certain embodiments, only one source is active at the same time. In other embodiments, a plurality of sources are active at the same time.

In various embodiments, the vehicle side 904 can include one or more components of the wireless power transfer system 100, described above with respect to FIG. 1. For example, the vehicle side 904 can include the battery unit 118, the electric vehicle induction coil 116, the electric vehicle wireless charging system 114, and the antenna 140. The vehicle side 904 can be configured to receive wireless charging power, via the wireless connection 908, as described above with respect to FIGS. 1-3. Although certain exemplary components are shown in FIG. 9, a person having ordinary skill in the art will appreciate that certain components can be added, omitted, and/or reordered.

In the wired path 922, the main EMI filter and rectifier 924 serves to rectify the incoming wired connection 906 and to filter frequencies caused by rectification (or other causes) that can emit unwanted electromagnetic interference. As shown, the main EMI filter and rectifier 924 receives an AC signal via the wired connection 906 and provides a rectified signal to the PFC unit 926.

The PFC unit 926 serves to reduce harmonic content in currents of the AC source 910. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. As shown, the PFC unit 926 receives the signal from the main EMI filter and rectifier 924, and provides the bulk capacitance 928 with a power-factor corrected signal.

The bulk capacitance 928 serves to smooth the signal entering the isolated DC-DC converter 930 and to counteract inductive effects of other components. In various embodiments, the bulk capacitance 928 can be incorporated into the PFC unit 926 and/or the isolated DC-DC converter 930.

The DC-DC converter 930 serves to isolate the combined path 944 from the mains power from the AC source 910. The DC-DC converter 930 can include, for example, a pair of inductive coils. In various embodiments, the DC-DC converter 930 can be configured to adjust a voltage level coming from the wired connection 906, as appropriate for charging the battery 942.

In the wireless path 932, the vehicle pad 934 is configured to receive wireless charging power, via the wireless connection 908, from the infrastructure side 902. In some embodiments, the vehicle pad 934 can include the electric vehicle induction coil 316 (FIG. 3). As shown, the vehicle pad 934 receives the wireless charging field from the wireless connection 908 and provides an output signal to the parallel vehicle tuning module 936.

The vehicle tuning circuit 936 serves to tune the impedance of the wireless path 932 for efficient wireless power transfer. In the illustrated embodiment, the vehicle tuning circuit 936 is configured as a parallel LC circuit. In other embodiments, the vehicle tuning circuit 936 can be configured as a series LC circuit. As shown, the vehicle tuning circuit 936 receives an input signal from the vehicle pad 934 and provides an output signal to the decoupling rectifier 938.

In the combined path 944, the decoupling rectifier 938 serves to provide DC power from an LF or DC signal. The decoupling rectifier 938 can generate the rectified signal via rectification. As shown, the decoupling rectifier 938 receives the LF input signal from the vehicle tuning circuit 936, receives the DC input signal from the isolated DC-DC converter 930, and provides a rectified power output to the output filter 940.

The output filter 940 serves to filter frequencies caused by rectification (or other causes) that can emit unwanted electromagnetic interference, and to otherwise smooth the output from the decoupling rectifier 938. As shown, the output filter 940 receives the signal from the decoupling rectifier 938 and provides a filtered output signal to the battery 942.

Figure 10:
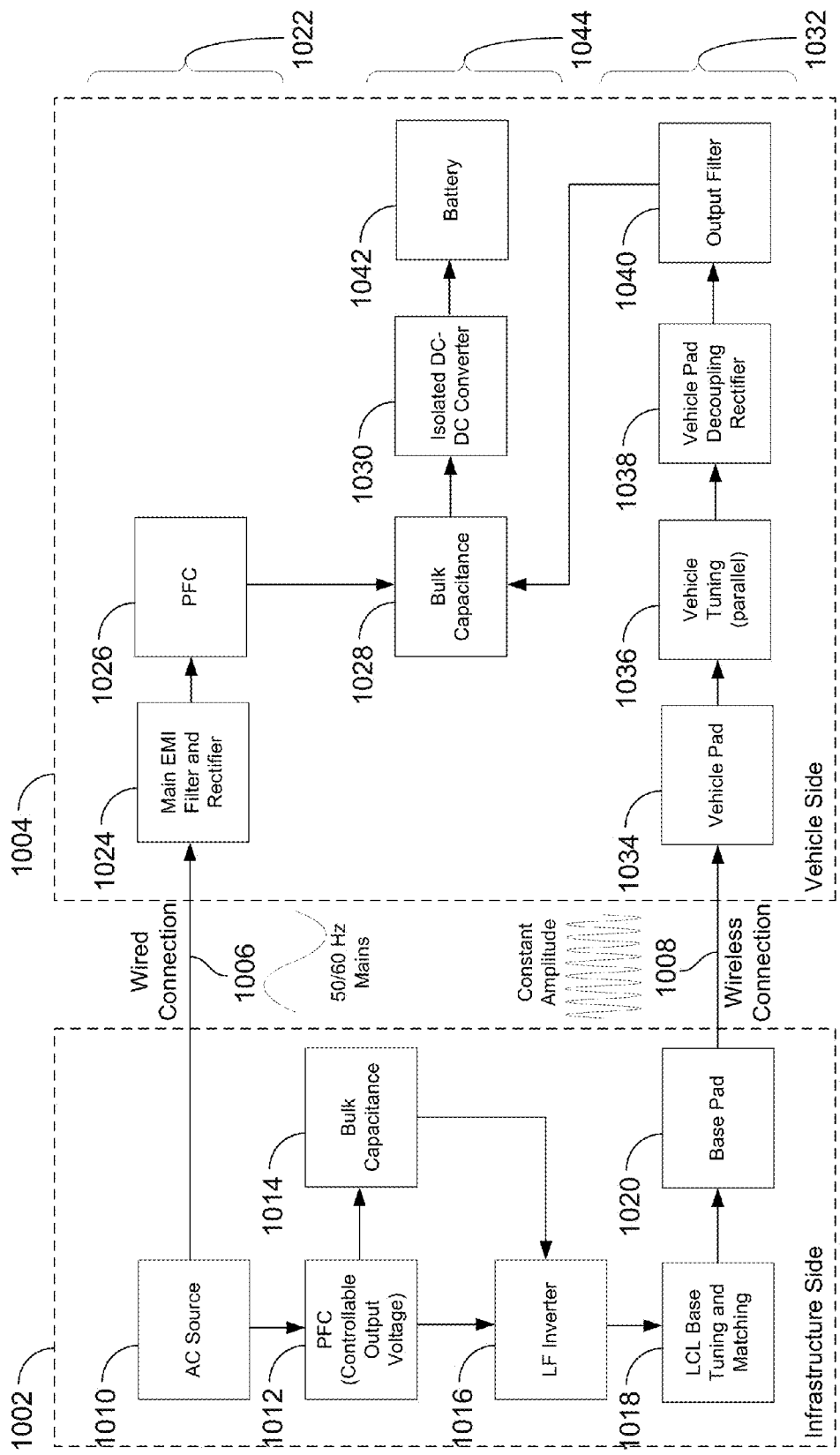
FIG. 10 is a functional block diagram showing exemplary components of another dual-source power transfer system.

FIG. 10 is a functional block diagram showing exemplary components of another dual-source power transfer system 1000. The dual-source power transfer system 1000 includes an infrastructure side 1002 and a vehicle side 1004, wherein power can be transferred from the infrastructure side 1002 to the vehicle side 1004 via a wired connection 1006 or a wireless connection 1008 connected by a wired connection 1006 and a wireless connection 1008, or both. In some embodiments, the wired connection 1006 can include a 50/60 Hz AC mains signal. The wireless connection 1008 can include a constant amplitude inductive charging field. Although various aspects of the infrastructure side 1002 and the vehicle side 1004 may be discussed herein as cohesive units, a person having ordinary skill in the art will appreciate that either of the infrastructure side 1002 and the vehicle side 1004 can be divided into one or more separate components or subsystems, and individual components or subsystems discussed can be implemented separately or can be integrated.

The infrastructure side 1002 serves to provide charging power, via the wired connection 1006 and/or the wireless connection 1008, to the vehicle side 1004. As shown in FIG. 10, the infrastructure side 1004 includes an AC power source 1010, a power-factor correction (PFC) unit 1012, a bulk capacitance 1014, a low-frequency (LF) inverter 1016, an LCL base tuning and matching unit 1018, and a base pad 1020. In various embodiments, the infrastructure side 1002 can include one or more components of the wireless power transfer system 100, described above with respect to FIG. 1. For example, the infrastructure side 1002 can include the local distribution center 130 and the base wireless charging system 102*a*. The infrastructure side 1002 can be configured to transmit wireless charging power, via the wireless connection 1008, as described above with respect to FIGS. 2-3. Although certain exemplary components are shown in FIG. 10, a person having ordinary skill in the art will appreciate that certain components can be added, omitted, and/or reordered.

The AC source 1010 serves to provide AC power to the wired connection 1006, and to one or more components driving the wireless connection 1008. As shown, the AC source 1010 provides power to the PFC unit 1012. The AC source 1010 can include, for example, the local distribution center 130 (FIG. 1) and/or the power backbone 132 (FIG. 1). In some embodiments, the source 1010 can include a DC source.

The PFC unit 1012 serves to reduce harmonic content in currents of the AC source 1010. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In various embodiments, the PFC unit 1012 can include active or passive PFC. In some embodiments, the PFC unit 1012 can be configured to control an output voltage. As shown, the PFC unit 1012 drives the bulk capacitance 1014 and the LF inverter 1016.

The bulk capacitance 1014 serves to smooth the waveform entering the LF inverter 1016 and to counteract inductive effects of other components. In various embodiments, the bulk capacitance 1014 can be incorporated into the PFC unit 1012 and/or the LF inverter 1016.

The LF inverter 1016 serves to generate the low-frequency signal for inductive field generation. In an embodiment, the LF inverter 1016 can be referred to as an LF converter. In various embodiments, the LF inverter 1016 can receive a signal from the PFC unit 1012 and output a low-frequency signal to the LCL base tuning and matching unit 1018.

The LCL base tuning and matching unit 1018 serves to filter out harmonics or other unwanted frequencies and match the impedance of the LF inverter 1016 to a wireless power induction coil. As shown, the LCL base tuning and matching unit 1018 is configured to receive the LF signal from the LF inverter 1016, and to output tuned/matched signal to the base pad 1020.

The base pad 1020 serves to transmit wireless charging power, via the wireless connection 1008, to the vehicle side 1004. In some embodiments, the base pad 1020 can include the base induction coil 304 (FIG. 3). As shown, the base pad 1020 receives the tuned/matched LF signal through the LCL base tuning and matching circuit 1018 and generates the wireless charging field for the wireless connection 1008. In some embodiments, the base pad 1020 can include transmit circuitry configured to provide the constant-amplitude wireless connection 1008 to the vehicle side 1004 as described above with respect to FIGS. 1-3.

The vehicle side 1004 serves to receive charging power, via the wired connection 1006 and/or the wireless connection 1008, from the infrastructure side 1002. As shown in FIG. 10, the vehicle side 1004 includes a wired path 1022 including a main electromagnetic interference (EMI) filter and rectifier 1024, and a PFC unit 1026. The vehicle side 1004 further includes a wireless path 1032 including a vehicle pad 1034, a vehicle tuning circuit 1036, a vehicle pad decoupling rectifier 1038, and an output filter 1040. The vehicle side 1004 further includes a combined path 1044 including a bulk capacitance 1028, an isolated DC-DC converter 1030, and the battery 1042.

In various embodiments, the wired path 1022, the wireless path 1032, or both, can be active at any given time. Thus, although various components in the combined path 1044 can be described herein as receiving power from more than once source, in certain embodiments, only one source is active at the same time. In other embodiments, a plurality of sources are active at the same time.

In various embodiments, the vehicle side 1004 can include one or more components of the wireless power transfer system 100, described above with respect to FIG. 1. For example, the vehicle side 1004 can include the battery unit 118, the electric vehicle induction coil 116, the electric vehicle wireless charging system 114, and the antenna 140. The vehicle side 1004 can be configured to receive wireless charging power, via the wireless connection 1008, as described above with respect to FIGS. 1-3. Although certain exemplary components are shown in FIG. 10, a person having ordinary skill in the art will appreciate that certain components can be added, omitted, and/or reordered.

In the wired path 1022, the main EMI filter and rectifier 1024 serves to rectify the incoming wired connection 1006 and to filter frequencies caused by rectification (or other causes) that can emit unwanted electromagnetic interference. As shown, the main EMI filter and rectifier 1024 receives an AC signal via the wired connection 1006 and provides a rectified signal to the PFC unit 1026.

The PFC unit 1026 serves to reduce harmonic content in currents of the AC source 1010. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. As shown, the PFC unit 1026 receives the signal from the main EMI filter and rectifier 1024, and provides the bulk capacitance 1028 with a power-factor corrected signal.

In the wireless path 1032, the vehicle pad 1034 is configured to receive wireless charging power, via the wireless connection 1008, from the infrastructure side 1002. In some embodiments, the vehicle pad 1034 can include the electric vehicle induction coil 316 (FIG. 3). As shown, the vehicle pad 1034 receives the wireless charging field from the wireless connection 1008 and provides an output signal to the parallel vehicle tuning module 1036.

The vehicle tuning circuit 1036 serves to tune the impedance of the wireless path 1032 for efficient wireless power transfer. In the illustrated embodiment, the vehicle tuning circuit 1036 is configured as a parallel LC circuit. In other embodiments, the vehicle tuning circuit 1036 can be configured as a series LC circuit. As shown, the vehicle tuning circuit 1036 receives an input signal from the vehicle pad 1034 and provides an output signal to the vehicle pad decoupling rectifier 1038.

The vehicle pad decoupling rectifier 1038 serves to provide rectified power from an LF signal. The vehicle pad decoupling rectifier 1038 can generate the rectified signal via rectification. As shown, the decoupling rectifier 1038 receives the LF input signal from the vehicle tuning circuit 1036, and provides a rectified power output to the output filter 1040.

The output filter 1040 serves to filter frequencies caused by rectification (or other causes) that can emit unwanted electromagnetic interference, and to otherwise smooth the output from the vehicle pad decoupling rectifier 1038. As shown, the output filter 1040 receives the signal from the vehicle pad decoupling rectifier 1038 and provides a filtered output signal to the bulk capacitance 1028.

In the combined path 1044, the bulk capacitance 1028 serves to smooth the signal entering the isolated DC-DC converter 1030 and to counteract inductive effects of other components. In various embodiments, the bulk capacitance 1028 can be incorporated into the PFC unit 1026 and/or the isolated DC-DC converter 1030.

The DC-DC converter 1030 serves to isolate the battery 1042 from the mains power from the AC source 1010. The DC-DC converter 1030 can include, for example, a pair of inductive coils. In various embodiments, the DC-DC converter 1030 can be configured to adjust a voltage level coming from the wired connection 1006, as appropriate for charging the battery 1042.

Figure 11:
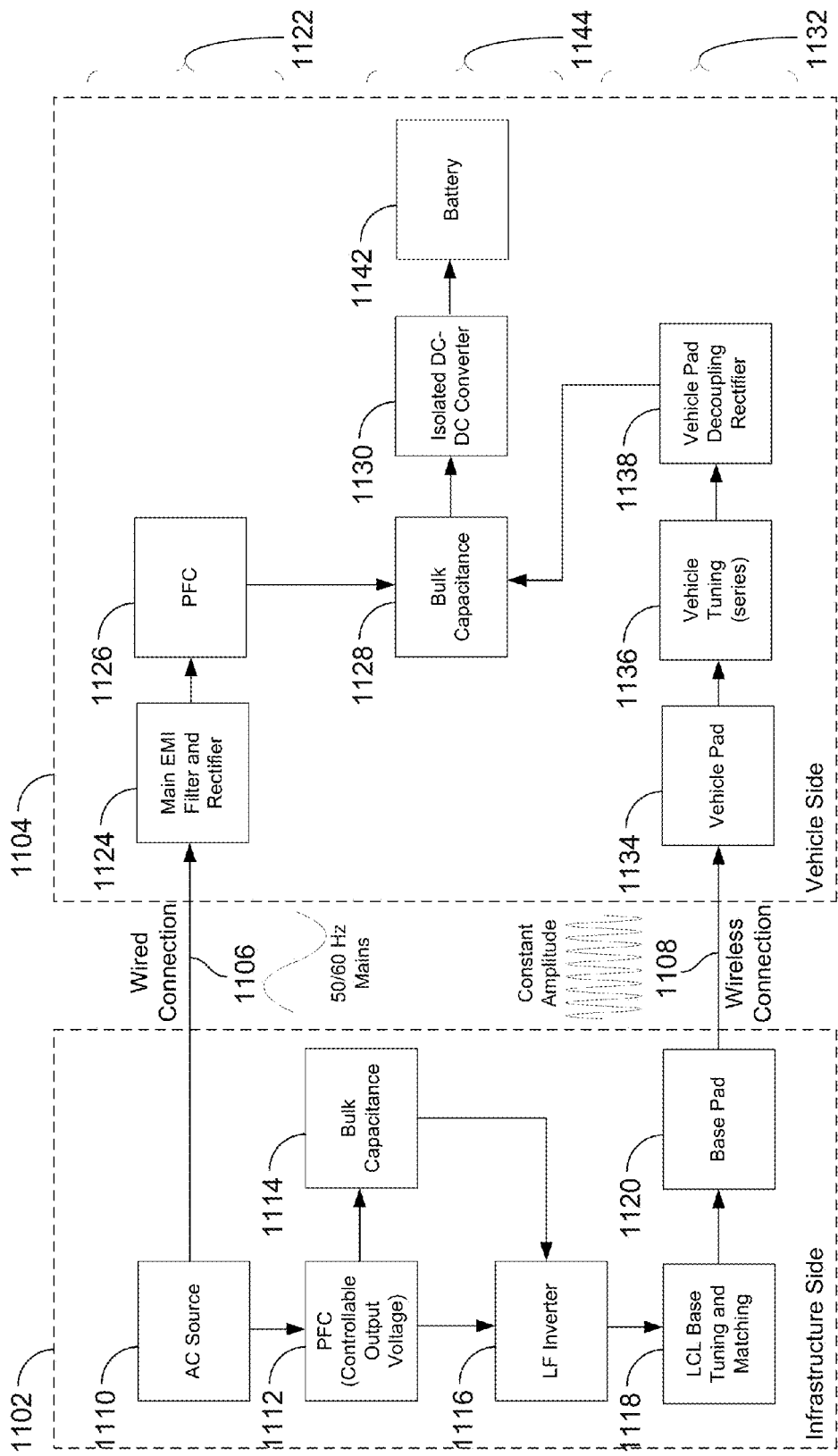
FIG. 11 is a functional block diagram showing exemplary components of another dual-source power transfer system.

FIG. 11 is a functional block diagram showing exemplary components of another dual-source power transfer system 1100. The dual-source power transfer system 1100 includes an infrastructure side 1102 and a vehicle side 1104, wherein power can be transferred from the infrastructure side 1102 to the vehicle side 1104 via a wired connection 1106 or a wireless connection 1108 connected by a wired connection 1106 and a wireless connection 1108, or both. In some embodiments, the wired connection 1106 can include a 50/60 Hz AC mains signal. The wireless connection 1108 can include a constant amplitude inductive charging field. Although various aspects of the infrastructure side 1102 and the vehicle side 1104 may be discussed herein as cohesive units, a person having ordinary skill in the art will appreciate that either of the infrastructure side 1102 and the vehicle side 1104 can be divided into one or more separate components or subsystems, and individual components or subsystems discussed can be implemented separately or can be integrated.

The infrastructure side 1102 serves to provide charging power, via the wired connection 1106 and/or the wireless connection 1108, to the vehicle side 1104. As shown in FIG. 11, the infrastructure side 1104 includes an AC power source 1110, a power-factor correction (PFC) unit 1112, a bulk capacitance 1114, a low-frequency (LF) inverter 1116, an LCL base tuning and matching unit 1118, and a base pad 1120. In various embodiments, the infrastructure side 1102 can include one or more components of the wireless power transfer system 110, described above with respect to FIG. 1. For example, the infrastructure side 1102 can include the local distribution center 130 and the base wireless charging system 112a. The infrastructure side 1102 can be configured to transmit wireless charging power, via the wireless connection 1108, as described above with respect to FIGS. 2-3. Although certain exemplary components are shown in FIG. 11, a person having ordinary skill in the art will appreciate that certain components can be added, omitted, and/or reordered.

The AC source 1110 serves to provide AC power to the wired connection 1106, and to one or more components driving the wireless connection 1108. As shown, the AC source 1110 provides power to the PFC unit 1112. The AC source 1110 can include, for example, the local distribution center 130 (FIG. 1) and/or the power backbone 132 (FIG. 1). In some embodiments, the source 1110 can include a DC source.

The PFC unit 1112 serves to reduce harmonic content in currents of the AC source 1110. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In various embodiments, the PFC unit 1112 can include active or passive PFC. In some embodiments, the PFC unit 1112 can be configured to control an output voltage. As shown, the PFC unit 1112 drives the bulk capacitance 1114 and the LF inverter 1116.

The bulk capacitance 1114 serves to smooth the waveform entering the LF inverter 1116 and to counteract inductive effects of other components. In various embodiments, the bulk capacitance 1114 can be incorporated into the PFC unit 1112 and/or the LF inverter 1116.

The LF inverter 1116 serves to generate the low-frequency signal for inductive field generation. In an embodiment, the LF inverter 1116 can be referred to as an LF converter. In various embodiments, the LF inverter 1116 can receive a signal from the PFC unit 1112 and output a low-frequency signal to the LCL base tuning and matching unit 1118.

The LCL base tuning and matching unit 1118 serves to filter out harmonics or other unwanted frequencies and match the impedance of the LF inverter 1116 to a wireless power induction coil. As shown, the LCL base tuning and matching unit 1118 is configured to receive the LF signal from the LF inverter 1116, and to output tuned/matched signal to the base pad 1120.

The base pad 1120 serves to transmit wireless charging power, via the wireless connection 1108, to the vehicle side 1104. In some embodiments, the base pad 1120 can include the base induction coil 304 (FIG. 3). As shown, the base pad 1120 receives the tuned/matched LF signal through the LCL base tuning and matching circuit 1118 and generates the wireless charging field for the wireless connection 1108. In some embodiments, the base pad 1120 can include transmit circuitry configured to provide the constant-amplitude wireless connection 1108 to the vehicle side 1104 as described above with respect to FIGS. 1-3.

The vehicle side 1104 serves to receive charging power, via the wired connection 1106 and/or the wireless connection 1108, from the infrastructure side 1102. As shown in FIG. 11, the vehicle side 1104 includes a wired path 1122 including a main electromagnetic interference (EMI) filter and rectifier 1124, and a PFC unit 1126. The vehicle side 1104 further includes a wireless path 1132 including a vehicle pad 1134, a vehicle tuning circuit 1136, and a vehicle pad decoupling rectifier 1138. The vehicle side 1104 further includes a combined path 1144 including a bulk capacitance 1128, an isolated DC-DC converter 1130, and the battery 1142.

In various embodiments, the wired path 1122, the wireless path 1132, or both, can be active at any given time. Thus, although various components in the combined path 1144 can be described herein as receiving power from more than once source, in certain embodiments, only one source is active at the same time. In other embodiments, a plurality of sources are active at the same time.

In various embodiments, the vehicle side 1104 can include one or more components of the wireless power transfer system 110, described above with respect to FIG. 1. For example, the vehicle side 1104 can include the battery unit 118, the electric vehicle induction coil 116, the electric vehicle wireless charging system 114, and the antenna 140. The vehicle side 1104 can be configured to receive wireless charging power, via the wireless connection 1108, as described above with respect to FIGS. 1-3. Although certain exemplary components are shown in FIG. 11, a person having ordinary skill in the art will appreciate that certain components can be added, omitted, and/or reordered.

In the wired path 1122, the main EMI filter and rectifier 1124 serves to rectify the incoming wired connection 1106 and to filter frequencies caused by rectification (or other causes) that can emit unwanted electromagnetic interference. As shown, the main EMI filter and rectifier 1124 receives an AC signal via the wired connection 1106 and provides a rectified signal to the PFC unit 1126.

The PFC unit 1126 serves to reduce harmonic content in currents of the AC source 1110. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. As shown, the PFC unit 1126 receives the signal from the main EMI filter and rectifier 1124, and provides the bulk capacitance 1128 with a power-factor corrected signal.

In the wireless path 1132, the vehicle pad 1134 is configured to receive wireless charging power, via the wireless connection 1108, from the infrastructure side 1102. In some embodiments, the vehicle pad 1134 can include the electric vehicle induction coil 316 (FIG. 3). As shown, the vehicle pad 1134 receives the wireless charging field from the wireless connection 1108 and provides an output signal to the series vehicle tuning module 1136.

The vehicle tuning circuit 1136 serves to tune the impedance of the wireless path 1132 for efficient wireless power transfer. In the illustrated embodiment, the vehicle tuning circuit 1136 is configured as a series LC circuit. In other embodiments, the vehicle tuning circuit 1136 can be configured as a parallel LC circuit. As shown, the vehicle tuning circuit 1136 receives an input signal from the vehicle pad 1134 and provides an output signal to the vehicle pad decoupling rectifier 1138.

The vehicle pad decoupling rectifier 1138 serves to provide rectified power from an LF signal. The vehicle pad decoupling rectifier 1138 can generate the rectified signal via rectification. As shown, the decoupling rectifier 1138 receives the LF input signal from the vehicle tuning circuit 1136, and provides a rectified power output to the bulk capacitance 1128.

In the combined path 1144, the bulk capacitance 1128 serves to smooth the signal entering the isolated DC-DC converter 1130 and to counteract inductive effects of other components. In various embodiments, the bulk capacitance 1128 can be incorporated into the PFC unit 1126 and/or the isolated DC-DC converter 1130.

The DC-DC converter 1130 serves to isolate the battery 1142 from the mains power from the AC source 1110. The DC-DC converter 1130 can include, for example, a pair of inductive coils. In various embodiments, the DC-DC converter 1130 can be configured to adjust a voltage level coming from the wired connection 1106, as appropriate for charging the battery 1142.

Figure 12:
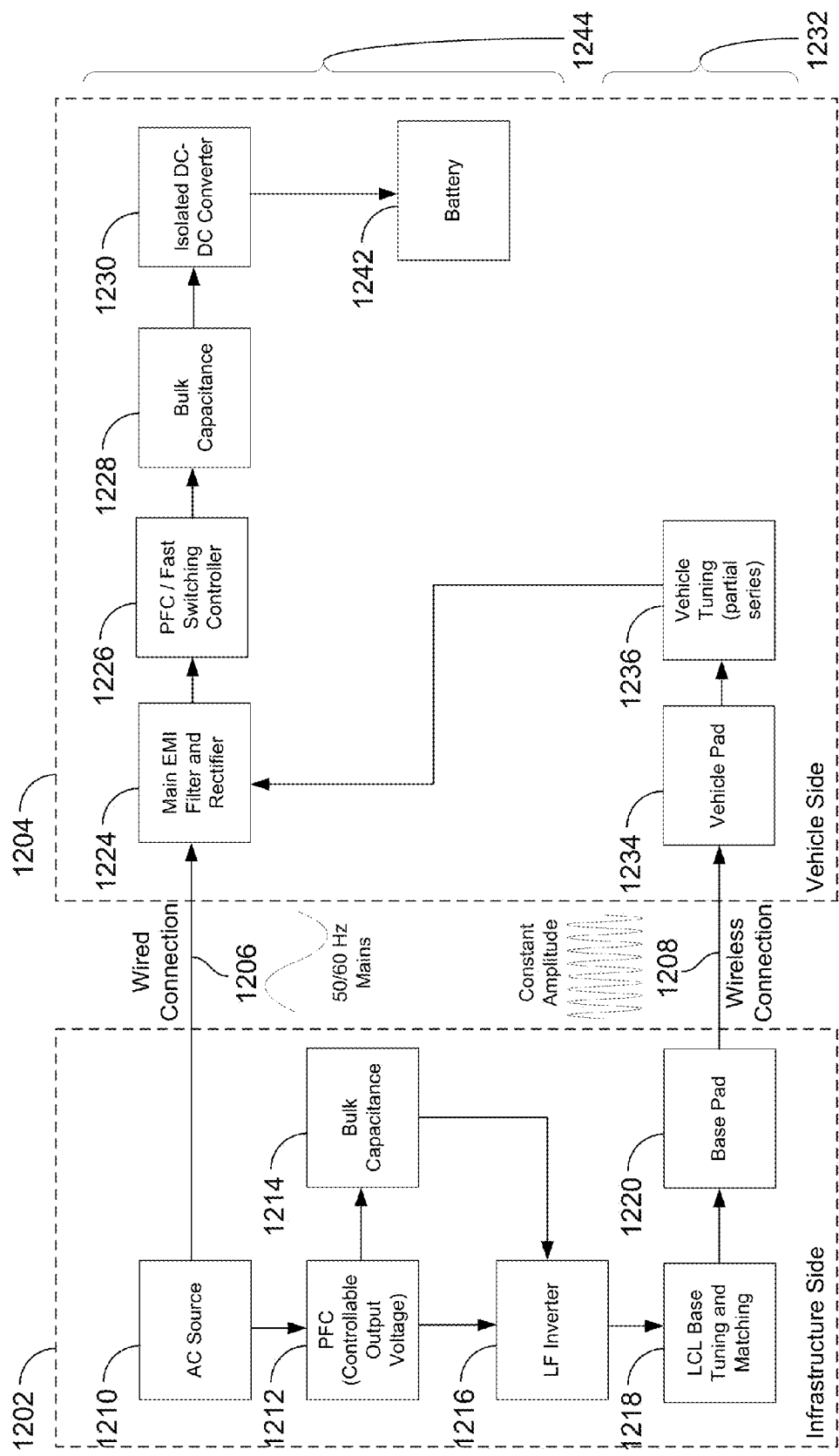
FIG. 12 is a functional block diagram showing exemplary components of another dual-source power transfer system.

FIG. 12 is a functional block diagram showing exemplary components of another dual-source power transfer system 1200. The dual-source power transfer system 1200 includes an infrastructure side 1202 and a vehicle side 1204, wherein power can be transferred from the infrastructure side 1202 to the vehicle side 1204 via a wired connection 1206 or a wireless connection 1208 connected by a wired connection 1206 and a wireless connection 1208, or both. In some embodiments, the wired connection 1206 can include a 50/60 Hz AC mains signal. The wireless connection 1208 can include a constant amplitude inductive charging field. Although various aspects of the infrastructure side 1202 and the vehicle side 1204 may be discussed herein as cohesive units, a person having ordinary skill in the art will appreciate that either of the infrastructure side 1202 and the vehicle side 1204 can be divided into one or more separate components or subsystems, and individual components or subsystems discussed can be implemented separately or can be integrated.

The infrastructure side 1202 serves to provide charging power, via the wired connection 1206 and/or the wireless connection 1208, to the vehicle side 1204. As shown in FIG. 12, the infrastructure side 1204 includes an AC power source 1210, a power-factor correction (PFC) unit 1212, a bulk capacitance 1214, a low-frequency (LF) inverter 1216, an LCL base tuning and matching unit 1218, and a base pad 1220. In various embodiments, the infrastructure side 1202 can include one or more components of the wireless power transfer system 120, described above with respect to FIG. 1. For example, the infrastructure side 1202 can include the local distribution center 130 and the base wireless charging system 122a. The infrastructure side 1202 can be configured to transmit wireless charging power, via the wireless connection 1208, as described above with respect to FIGS. 2-3. Although certain exemplary components are shown in FIG. 12, a person having ordinary skill in the art will appreciate that certain components can be added, omitted, and/or reordered.

The AC source 1210 serves to provide AC power to the wired connection 1206, and to one or more components driving the wireless connection 1208. As shown, the AC source 1210 provides power to the PFC unit 1212. The AC source 1210 can include, for example, the local distribution center 130 (FIG. 1) and/or the power backbone 132 (FIG. 1). In some embodiments, the source 1210 can include a DC source.

The PFC unit 1212 serves to reduce harmonic content in currents of the AC source 1210. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In various embodiments, the PFC unit 1212 can include active or passive PFC. In some embodiments, the PFC unit 1212 can be configured to control an output voltage. As shown, the PFC unit 1212 drives the bulk capacitance 1214 and the LF inverter 1216.

The bulk capacitance 1214 serves to smooth the waveform entering the LF inverter 1216 and to counteract inductive effects of other components. In various embodiments, the bulk capacitance 1214 can be incorporated into the PFC unit 1212 and/or the LF inverter 1216.

The LF inverter 1216 serves to generate the low-frequency signal for inductive field generation. In an embodiment, the LF inverter 1216 can be referred to as an LF converter. In various embodiments, the LF inverter 1216 can receive a signal from the PFC unit 1212 and output a low-frequency signal to the LCL base tuning and matching unit 1218.

The LCL base tuning and matching unit 1218 serves to filter out harmonics or other unwanted frequencies and match the impedance of the LF inverter 1216 to a wireless power induction coil. As shown, the LCL base tuning and matching unit 1218 is configured to receive the LF signal from the LF inverter 1216, and to output tuned/matched signal to the base pad 1220.

The base pad 1220 serves to transmit wireless charging power, via the wireless connection 1208, to the vehicle side 1204. In some embodiments, the base pad 1220 can include the base induction coil 304 (FIG. 3). As shown, the base pad 1220 receives the tuned/matched LF signal through the LCL base tuning and matching circuit 1218 and generates the wireless charging field for the wireless connection 1208. In some embodiments, the base pad 1220 can include transmit circuitry configured to provide the constant-amplitude wireless connection 1208 to the vehicle side 1204 as described above with respect to FIGS. 1-3.

The vehicle side 1204 serves to receive charging power, via the wired connection 1206 and/or the wireless connection 1208, from the infrastructure side 1202. As shown in FIG. 12, the vehicle side 1204 includes a combined path 1244 including a main electromagnetic interference (EMI) filter and rectifier 1224, a PFC unit 1226, a bulk capacitance 1228, an isolated DC-DC converter 1230, and the battery 1242. The vehicle side 1204 further includes a wireless path 1232 including a vehicle pad 1234, a vehicle tuning circuit 1236, and a vehicle pad decoupling rectifier 1238.

In various embodiments, the wired path 1222, the wireless path 1232, or both, can be active at any given time. Thus, although various components in the combined path 1244 can be described herein as receiving power from more than once source, in certain embodiments, only one source is active at the same time. In other embodiments, a plurality of sources are active at the same time.

In various embodiments, the vehicle side 1204 can include one or more components of the wireless power transfer system 120, described above with respect to FIG. 1. For example, the vehicle side 1204 can include the battery unit 128, the electric vehicle induction coil 126, the electric vehicle wireless charging system 124, and the antenna 140. The vehicle side 1204 can be configured to receive wireless charging power, via the wireless connection 1208, as described above with respect to FIGS. 1-3. Although certain exemplary components are shown in FIG. 12, a person having ordinary skill in the art will appreciate that certain components can be added, omitted, and/or reordered.

In the combined path 1244, the main EMI filter and rectifier 1224 serves to rectify the incoming wired connection 1206 and to filter frequencies caused by rectification (or other causes) that can emit unwanted electromagnetic interference. In the illustrated embodiment, the main EMI filter and rectifier 1224 further serves to rectify and decouple the incoming wireless connection 1208. As shown, the main EMI filter and rectifier 1224 receives an AC signal via the wired connection 1206, receives an LF signal from the vehicle pad 1234 (through the vehicle tuning circuit 1236), and provides a rectified signal to the PFC unit 1226.

The PFC unit 1226 serves to reduce harmonic content in currents of the AC source 1210. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. As shown, the PFC unit 1226 receives the signal from the main EMI filter and rectifier 1224, and provides the bulk capacitance 1228 with a power-factor corrected signal.

Because the illustrated PFC unit 1226 receives signals powered by both the wired connection 1206 and/or the wireless connection 1208, power-factor correction can be more complex. For example, the LF signal received at the vehicle pad 1234 can cause quicker changes in current flow than the AC signal received via the wired connection 1206. The PFC unit 1226 can include a fast switching controller configured to respond to faster changes in current flow.

The bulk capacitance 1228 serves to smooth the signal entering the isolated DC-DC converter 1230 and to counteract inductive effects of other components. In various embodiments, the bulk capacitance 1228 can be incorporated into the PFC unit 1226 and/or the isolated DC-DC converter 1230.

The DC-DC converter 1230 serves to isolate the battery 1242 from the mains power from the AC source 1210. The DC-DC converter 1230 can include, for example, a pair of inductive coils. In various embodiments, the DC-DC converter 1230 can be configured to adjust a voltage level coming from the wired connection 1206, as appropriate for charging the battery 1242.

In the wireless path 1232, the vehicle pad 1234 is configured to receive wireless charging power, via the wireless connection 1208, from the infrastructure side 1202. In some embodiments, the vehicle pad 1234 can include the electric vehicle induction coil 316 (FIG. 3). As shown, the vehicle pad 1234 receives the wireless charging field from the wireless connection 1208 and provides an output signal to the partial series vehicle tuning module 1236.

The vehicle tuning circuit 1236 serves to tune the impedance of the wireless path 1232 for efficient wireless power transfer. In the illustrated embodiment, the vehicle tuning circuit 1236 is configured as a parallel with partial series LC circuit. In other embodiments, the vehicle tuning circuit 1236 can be configured as a series LC circuit or a parallel LC circuit. As shown, the vehicle tuning circuit 1236 receives an input signal from the vehicle pad 1234 and provides an output signal to the main EMI filter and rectifier 1224.

Figure 13:
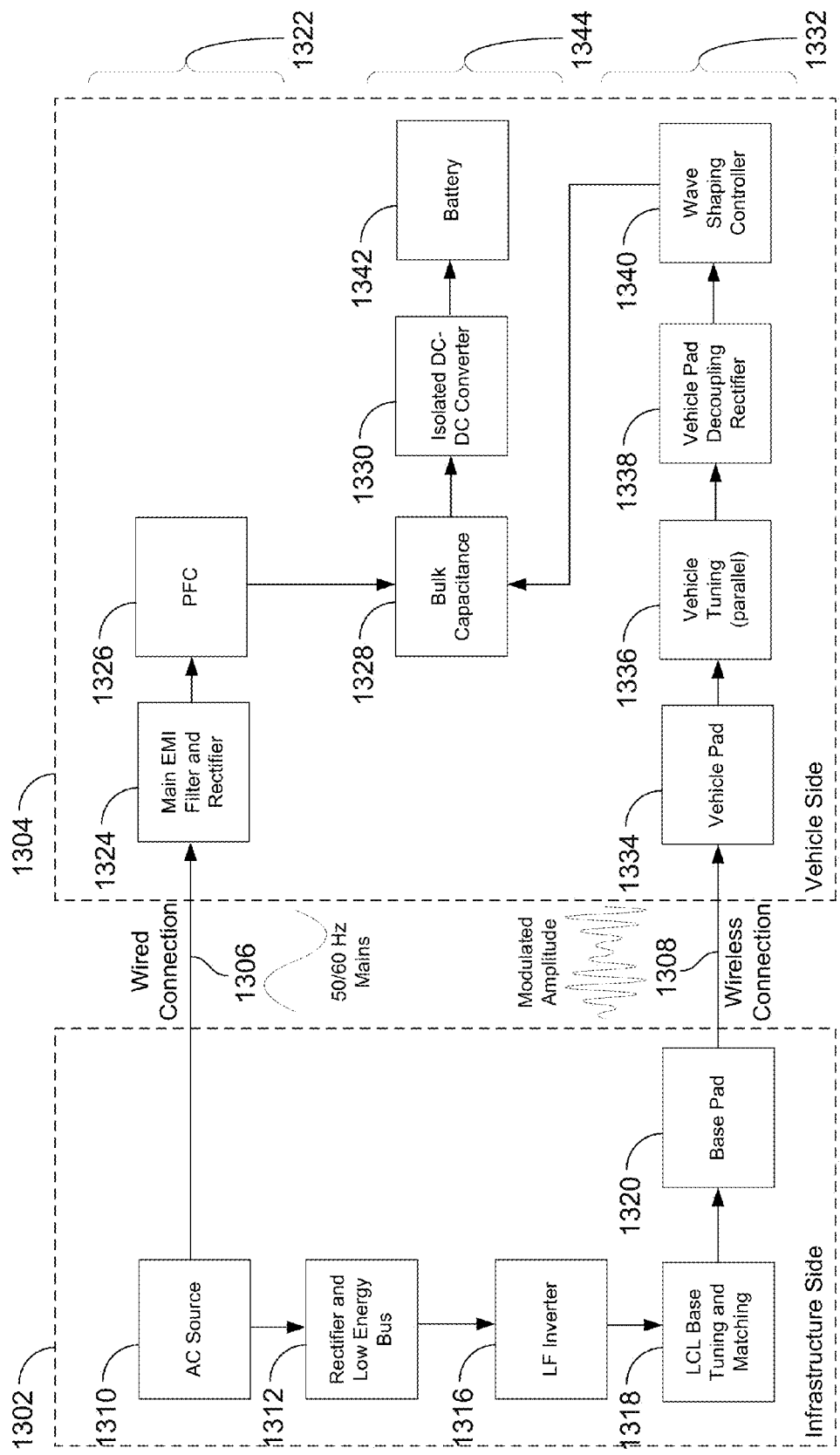
FIG. 13 is a functional block diagram showing exemplary components of another dual-source power transfer system.

FIG. 13 is a functional block diagram showing exemplary components of another dual-source power transfer system 1300. The dual-source power transfer system 1300 includes an infrastructure side 1302 and a vehicle side 1304, wherein power can be transferred from the infrastructure side 1302 to the vehicle side 1304 via a wired connection 1306 or a wireless connection 1308 connected by a wired connection 1306 and a wireless connection 1308, or both. In some embodiments, the wired connection 1306 can include a 50/60 Hz AC mains signal. The wireless connection 1308 can include a modulated amplitude inductive charging field. Although various aspects of the infrastructure side 1302 and the vehicle side 1304 may be discussed herein as cohesive units, a person having ordinary skill in the art will appreciate that either of the infrastructure side 1302 and the vehicle side 1304 can be divided into one or more separate components or subsystems, and individual components or subsystems discussed can be implemented separately or can be integrated.

The infrastructure side 1302 serves to provide charging power, via the wired connection 1306 and/or the wireless connection 1308, to the vehicle side 1304. As shown in FIG. 13, the infrastructure side 1304 includes an AC power source 1310, a rectifier and low energy bus 1312, a low-frequency (LF) inverter 1316, an LCL base tuning and matching unit 1318, and a base pad 1320. In various embodiments, the infrastructure side 1302 can include one or more components of the wireless power transfer system 130, described above with respect to FIG. 1. For example, the infrastructure side 1302 can include the local distribution center 130 and the base wireless charging system 132a. The infrastructure side 1302 can be configured to transmit wireless charging power, via the wireless connection 1308, as described above with respect to FIGS. 2-3. Although certain exemplary components are shown in FIG. 13, a person having ordinary skill in the art will appreciate that certain components can be added, omitted, and/or reordered.

The AC source 1310 serves to provide AC power to the wired connection 1306, and to one or more components driving the wireless connection 1308. As shown, the AC source 1310 provides power to the rectifier and low energy bus 1312. The AC source 1310 can include, for example, the local distribution center 130 (FIG. 1) and/or the power backbone 132 (FIG. 1). In some embodiments, the source 1310 can include a DC source.

The rectifier and low energy bus 1312 serves to provide a modulated power signal from the AC source 1310 signal. The rectifier and low energy bus 1312 can generate the modulated power signal via rectification. As shown, the rectifier and low energy bus 1312 receives the AC input signal from the AC source 1310, and provides a rectified power output on a low energy bus to the LF inverter 1316.

The LF inverter 1316 serves to generate the low-frequency signal for inductive field generation. In an embodiment, the LF inverter 1316 can be referred to as an LF converter. In various embodiments, the LF inverter 1316 can receive a signal from the rectifier and low energy bus 1312 and output a low-frequency signal to the LCL base tuning and matching unit 1318.

The LCL base tuning and matching unit 1318 serves to filter out harmonics or other unwanted frequencies and match the impedance of the LF inverter 1316 to a wireless power induction coil. As shown, the LCL base tuning and matching unit 1318 is configured to receive the LF signal from the LF inverter 1316, and to output tuned/matched signal to the base pad 1320.

The base pad 1320 serves to transmit wireless charging power, via the wireless connection 1308, to the vehicle side 1304. In some embodiments, the base pad 1320 can include the base induction coil 304 (FIG. 3). As shown, the base pad 1320 receives the tuned/matched LF signal through the LCL base tuning and matching circuit 1318 and generates the wireless charging field for the wireless connection 1308. In some embodiments, the base pad 1320 can include transmit circuitry configured to provide the modulated-amplitude wireless connection 1308 to the vehicle side 1304 as described above with respect to FIGS. 1-3.

The vehicle side 1304 serves to receive charging power, via the wired connection 1306 and/or the wireless connection 1308, from the infrastructure side 1302. As shown in FIG. 13, the vehicle side 1304 includes a wired path 1322 including a main electromagnetic interference (EMI) filter and rectifier 1324, and a PFC unit 1326. The vehicle side 1304 further includes a wireless path 1332 including a vehicle pad 1334, a vehicle tuning circuit 1336, a vehicle pad decoupling rectifier 1338, and a wave shaping controller 1340. The vehicle side 1304 further includes a combined path 1344 including a bulk capacitance 1328, an isolated DC-DC converter 1330, and the battery 1342.

In various embodiments, the wired path 1322, the wireless path 1332, or both, can be active at any given time. Thus, although various components in the combined path 1344 can be described herein as receiving power from more than once source, in certain embodiments, only one source is active at the same time. In other embodiments, a plurality of sources are active at the same time.

In various embodiments, the vehicle side 1304 can include one or more components of the wireless power transfer system 130, described above with respect to FIG. 1. For example, the vehicle side 1304 can include the battery unit 118, the electric vehicle induction coil 116, the electric vehicle wireless charging system 114, and the antenna 140. The vehicle side 1304 can be configured to receive wireless charging power, via the wireless connection 1308, as described above with respect to FIGS. 1-3. Although certain exemplary components are shown in FIG. 13, a person having ordinary skill in the art will appreciate that certain components can be added, omitted, and/or reordered.

In the wired path 1322, the main EMI filter and rectifier 1324 serves to rectify the incoming wired connection 1306 and to filter frequencies caused by rectification (or other causes) that can emit unwanted electromagnetic interference. As shown, the main EMI filter and rectifier 1324 receives an AC signal via the wired connection 1306 and provides a rectified signal to the PFC unit 1326.

The PFC unit 1326 serves to reduce harmonic content in currents of the AC source 1310. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. As shown, the PFC unit 1326 receives the signal from the main EMI filter and rectifier 1324, and provides the bulk capacitance 1328 with a power-factor corrected signal.

In the wireless path 1332, the vehicle pad 1334 is configured to receive wireless charging power, via the wireless connection 1308, from the infrastructure side 1302. In some embodiments, the vehicle pad 1334 can include the electric vehicle induction coil 316 (FIG. 3). As shown, the vehicle pad 1334 receives the wireless charging field from the wireless connection 1308 and provides an output signal to the parallel vehicle tuning module 1336.

The vehicle tuning circuit 1336 serves to tune the impedance of the wireless path 1332 for efficient wireless power transfer. In the illustrated embodiment, the vehicle tuning circuit 1336 is configured as a parallel LC circuit. In other embodiments, the vehicle tuning circuit 1336 can be configured as a series LC circuit. As shown, the vehicle tuning circuit 1336 receives an input signal from the vehicle pad 1334 and provides an output signal to the vehicle pad decoupling rectifier 1338.

The vehicle pad decoupling rectifier 1338 serves to provide rectified power from an LF signal. The vehicle pad decoupling rectifier 1338 can generate the rectified signal via rectification. As shown, the decoupling rectifier 1338 receives the LF input signal from the vehicle tuning circuit 1336, and provides a rectified power output to the wave shaping controller 1340.

The wave shaping controller 1340 serves to reduce harmonic content and maintain power quality. In some embodiments, the wave shaping controller 1340 can include a PFC unit or similar circuitry. As shown, the wave shaping controller 1340 receives the signal from the vehicle pad decoupling rectifier 1338, and provides the bulk capacitance 1328 with a wave-shaped signal.

In the combined path 1344, the bulk capacitance 1328 serves to smooth the signal entering the isolated DC-DC converter 1330 and to counteract inductive effects of other components. In various embodiments, the bulk capacitance 1328 can be incorporated into the PFC unit 1326 and/or the isolated DC-DC converter 1330.

The DC-DC converter 1330 serves to isolate the battery 1342 from the mains power from the AC source 1310. The DC-DC converter 1330 can include, for example, a pair of inductive coils. In various embodiments, the DC-DC converter 1330 can be configured to adjust a voltage level coming from the wired connection 1306, as appropriate for charging the battery 1342.

Figure 14:
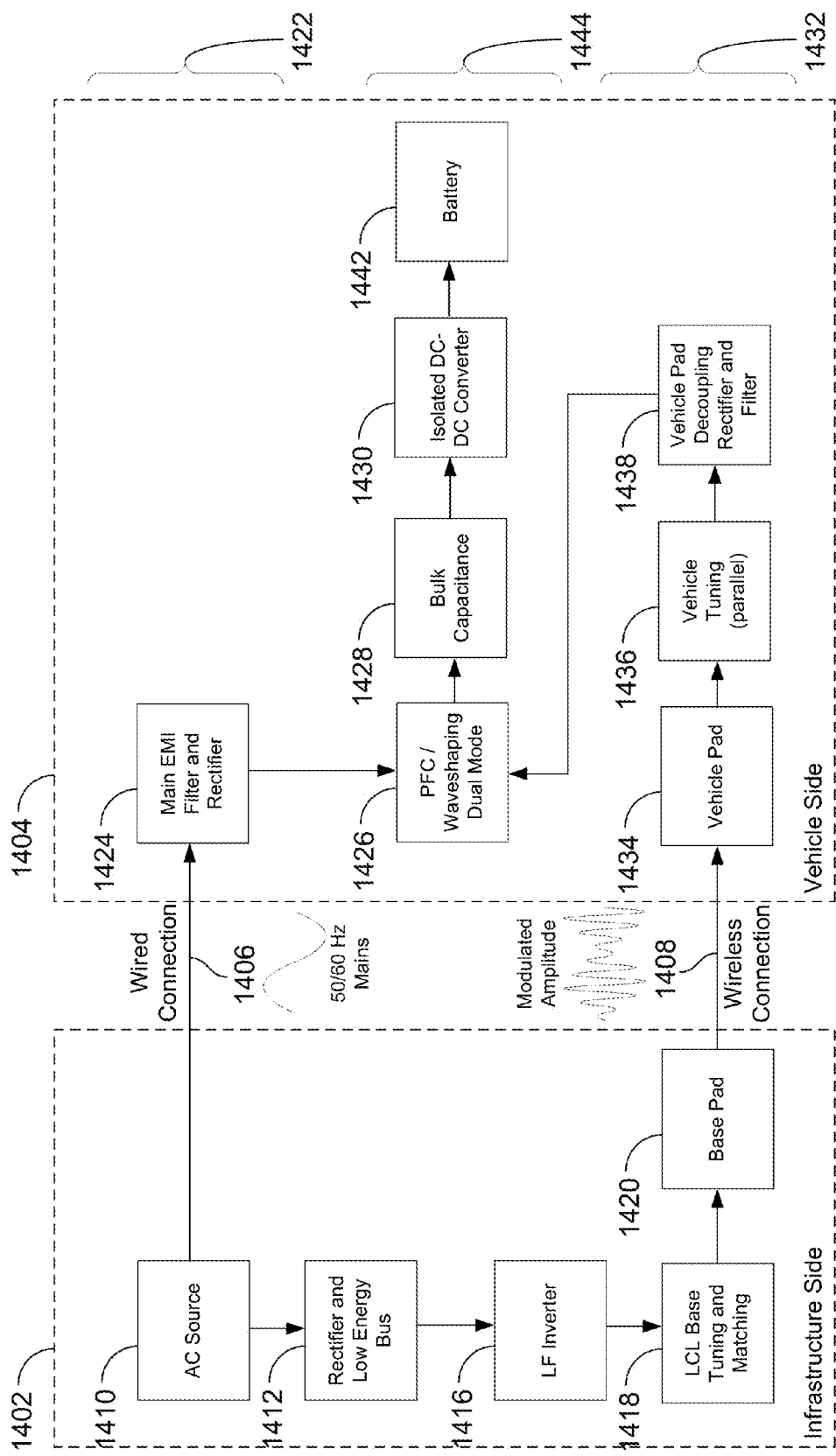
FIG. 14 is a functional block diagram showing exemplary components of another dual-source power transfer system.

FIG. 14 is a functional block diagram showing exemplary components of another dual-source power transfer system 1400. The dual-source power transfer system 1400 includes an infrastructure side 1402 and a vehicle side 1404, wherein power can be transferred from the infrastructure side 1402 to the vehicle side 1404 via a wired connection 1406 or a wireless connection 1408 connected by a wired connection 1406 and a wireless connection 1408, or both. In some embodiments, the wired connection 1406 can include a 50/60 Hz AC mains signal. The wireless connection 1408 can include a modulated amplitude inductive charging field. Although various aspects of the infrastructure side 1402 and the vehicle side 1404 may be discussed herein as cohesive units, a person having ordinary skill in the art will appreciate that either of the infrastructure side 1402 and the vehicle side 1404 can be divided into one or more separate components or subsystems, and individual components or subsystems discussed can be implemented separately or can be integrated.

The infrastructure side 1402 serves to provide charging power, via the wired connection 1406 and/or the wireless connection 1408, to the vehicle side 1404. As shown in FIG. 14, the infrastructure side 1404 includes an AC power source 1410, a rectifier and low energy bus 1412, a low-frequency (LF) inverter 1416, an LCL base tuning and matching unit 1418, and a base pad 1420. In various embodiments, the infrastructure side 1402 can include one or more components of the wireless power transfer system 140, described above with respect to FIG. 1. For example, the infrastructure side 1402 can include the local distribution center 140 and the base wireless charging system 142a. The infrastructure side 1402 can be configured to transmit wireless charging power, via the wireless connection 1408, as described above with respect to FIGS. 2-3. Although certain exemplary components are shown in FIG. 14, a person having ordinary skill in the art will appreciate that certain components can be added, omitted, and/or reordered.

The AC source 1410 serves to provide AC power to the wired connection 1406, and to one or more components driving the wireless connection 1408. As shown, the AC source 1410 provides power to the rectifier and low energy bus 1412. The AC source 1410 can include, for example, the local distribution center 140 (FIG. 1) and/or the power backbone 142 (FIG. 1). In some embodiments, the source 1410 can include a DC source.

The rectifier and low energy bus 1412 serves to provide a modulated power signal from the AC source 1410 signal. The rectifier and low energy bus 1412 can generate the modulated power signal via rectification. As shown, the rectifier and low energy bus 1412 receives the AC input signal from the AC source 1410, and provides a rectified power output on a low energy bus to the LF inverter 1416.

The LF inverter 1416 serves to generate the low-frequency signal for inductive field generation. In an embodiment, the LF inverter 1416 can be referred to as an LF converter. In various embodiments, the LF inverter 1416 can receive a signal from the rectifier and low energy bus 1412 and output a low-frequency signal to the LCL base tuning and matching unit 1418.

The LCL base tuning and matching unit 1418 serves to filter out harmonics or other unwanted frequencies and match the impedance of the LF inverter 1416 to a wireless power induction coil. As shown, the LCL base tuning and matching unit 1418 is configured to receive the LF signal from the LF inverter 1416, and to output tuned/matched signal to the base pad 1420.

The base pad 1420 serves to transmit wireless charging power, via the wireless connection 1408, to the vehicle side 1404. In some embodiments, the base pad 1420 can include the base induction coil 304 (FIG. 3). As shown, the base pad 1420 receives the tuned/matched LF signal through the LCL base tuning and matching circuit 1418 and generates the wireless charging field for the wireless connection 1408. In some embodiments, the base pad 1420 can include transmit circuitry configured to provide the modulated-amplitude wireless connection 1408 to the vehicle side 1404 as described above with respect to FIGS. 1-3.

The vehicle side 1404 serves to receive charging power, via the wired connection 1406 and/or the wireless connection 1408, from the infrastructure side 1402. As shown in FIG. 14, the vehicle side 1404 includes a wired path 1422 including a main electromagnetic interference (EMI) filter and rectifier 1424. The vehicle side 1404 further includes a wireless path 1432 including a vehicle pad 1434, a vehicle tuning circuit 1436, and a vehicle pad decoupling rectifier and filter 1438. The vehicle side 1404 further includes a combined path 1444 including a dual-mode PFC and wave-shaping unit 1426, a bulk capacitance 1428, an isolated DC-DC converter 1430, and the battery 1442.

In various embodiments, the wired path 1422, the wireless path 1432, or both, can be active at any given time. Thus, although various components in the combined path 1444 can be described herein as receiving power from more than once source, in certain embodiments, only one source is active at the same time. In other embodiments, a plurality of sources are active at the same time.

In various embodiments, the vehicle side 1404 can include one or more components of the wireless power transfer system 140, described above with respect to FIG. 1. For example, the vehicle side 1404 can include the battery unit 118, the electric vehicle induction coil 116, the electric vehicle wireless charging system 114, and the antenna 140. The vehicle side 1404 can be configured to receive wireless charging power, via the wireless connection 1408, as described above with respect to FIGS. 1-3. Although certain exemplary components are shown in FIG. 14, a person having ordinary skill in the art will appreciate that certain components can be added, omitted, and/or reordered.

In the wired path 1422, the main EMI filter and rectifier 1424 serves to rectify the incoming wired connection 1406 and to filter frequencies caused by rectification (or other causes) that can emit unwanted electromagnetic interference. As shown, the main EMI filter and rectifier 1424 receives an AC signal via the wired connection 1406 and provides a rectified signal to the dual-mode PFC and wave-shaping unit 1426.

In the wireless path 1432, the vehicle pad 1434 is configured to receive wireless charging power, via the wireless connection 1408, from the infrastructure side 1402. In some embodiments, the vehicle pad 1434 can include the electric vehicle induction coil 316 (FIG. 3). As shown, the vehicle pad 1434 receives the wireless charging field from the wireless connection 1408 and provides an output signal to the parallel vehicle tuning module 1436.

The vehicle tuning circuit 1436 serves to tune the impedance of the wireless path 1432 for efficient wireless power transfer. In the illustrated embodiment, the vehicle tuning circuit 1436 is configured as a parallel LC circuit. In other embodiments, the vehicle tuning circuit 1436 can be configured as a series LC circuit. As shown, the vehicle tuning circuit 1436 receives an input signal from the vehicle pad 1434 and provides an output signal to the vehicle pad decoupling rectifier and filter 1438.

The vehicle pad decoupling rectifier and filter 1438 serves to provide rectified power from an LF signal. The vehicle pad decoupling rectifier and filter 1438 can generate the rectified signal via rectification. The vehicle pad decoupling rectifier and filter 1438 is further configured to filter the rectified signal. As shown, the decoupling rectifier and filter 1438 receives the LF input signal from the vehicle tuning circuit 1436, and provides a rectified signal to the dual-mode PFC and wave-shaping unit 1426.

In the combined path 1444, the dual-mode PFC and wave-shaping unit 1426 serves to reduce harmonic content in currents of the AC source 1410 and maintain power quality. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. The dual-mode PFC and wave-shaping unit 1426 is configured as both a PFC and a wave-shaping unit. As shown, the dual-mode PFC and wave-shaping unit 1426 receives the signal from the main EMI filter and rectifier 1424, and provides the bulk capacitance 1428 with a power-factor corrected signal.

The bulk capacitance 1428 serves to smooth the signal entering the isolated DC-DC converter 1430 and to counteract inductive effects of other components. In various embodiments, the bulk capacitance 1428 can be incorporated into the dual-mode PFC and wave-shaping unit 1426 and/or the isolated DC-DC converter 1430.

The DC-DC converter 1430 serves to isolate the battery 1442 from the mains power from the AC source 1410. The DC-DC converter 1430 can include, for example, a pair of inductive coils. In various embodiments, the DC-DC converter 1430 can be configured to adjust a voltage level coming from the wired connection 1406, as appropriate for charging the battery 1442.

Figure 15:
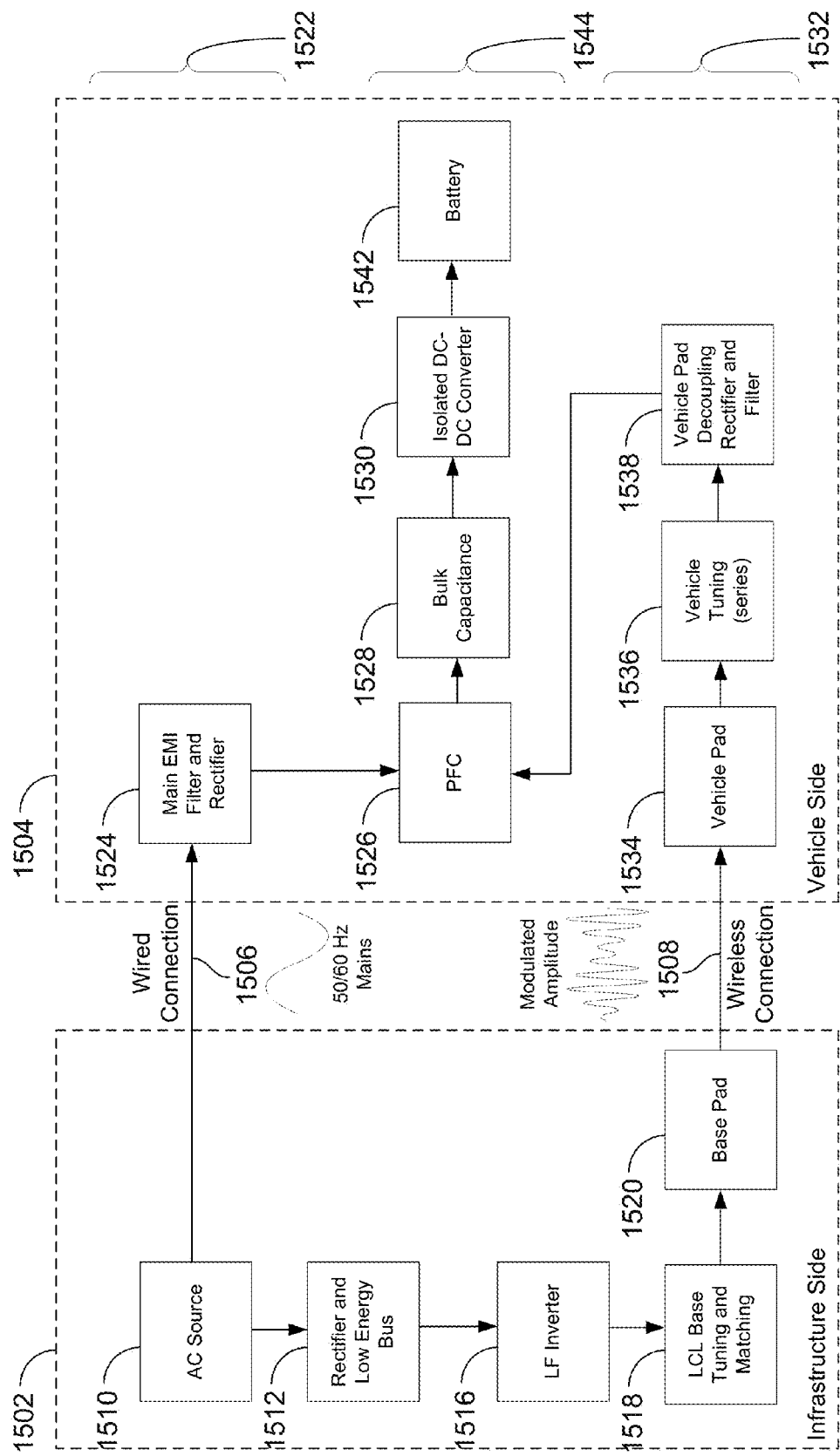
FIG. 15 is a functional block diagram showing exemplary components of another dual-source power transfer system.

FIG. 15 is a functional block diagram showing exemplary components of another dual-source power transfer system 1500. The dual-source power transfer system 1500 includes an infrastructure side 1502 and a vehicle side 1504, wherein power can be transferred from the infrastructure side 1502 to the vehicle side 1504 via a wired connection 1506 or a wireless connection 1508 connected by a wired connection 1506 and a wireless connection 1508, or both. In some embodiments, the wired connection 1506 can include a 50/60 Hz AC mains signal. The wireless connection 1508 can include a modulated amplitude inductive charging field. Although various aspects of the infrastructure side 1502 and the vehicle side 1504 may be discussed herein as cohesive units, a person having ordinary skill in the art will appreciate that either of the infrastructure side 1502 and the vehicle side 1504 can be divided into one or more separate components or subsystems, and individual components or subsystems discussed can be implemented separately or can be integrated.

The infrastructure side 1502 serves to provide charging power, via the wired connection 1506 and/or the wireless connection 1508, to the vehicle side 1504. As shown in FIG. 15, the infrastructure side 1504 includes an AC power source 1510, a rectifier and low energy bus 1512, a low-frequency (LF) inverter 1516, an LCL base tuning and matching unit 1518, and a base pad 1520. In various embodiments, the infrastructure side 1502 can include one or more components of the wireless power transfer system 150, described above with respect to FIG. 1. For example, the infrastructure side 1502 can include the local distribution center 150 and the base wireless charging system 152*a*. The infrastructure side 1502 can be configured to transmit wireless charging power, via the wireless connection 1508, as described above with respect to FIGS. 2-3. Although certain exemplary components are shown in FIG. 15, a person having ordinary skill in the art will appreciate that certain components can be added, omitted, and/or reordered.

The AC source 1510 serves to provide AC power to the wired connection 1506, and to one or more components driving the wireless connection 1508. As shown, the AC source 1510 provides power to the rectifier and low energy bus 1512. The AC source 1510 can include, for example, the local distribution center 150 (FIG. 1) and/or the power backbone 152 (FIG. 1). In some embodiments, the source 1510 can include a DC source.

The rectifier and low energy bus 1512 serves to provide a modulated power signal from the AC source 1510 signal. The rectifier and low energy bus 1512 can generate the modulated power signal via rectification. As shown, the rectifier and low energy bus 1512 receives the AC input signal from the AC source 1510, and provides a rectified power output on a low energy bus to the LF inverter 1516.

The LF inverter 1516 serves to generate the low-frequency signal for inductive field generation. In an embodiment, the LF inverter 1516 can be referred to as an LF converter. In various embodiments, the LF inverter 1516 can receive a signal from the rectifier and low energy bus 1512 and output a low-frequency signal to the LCL base tuning and matching unit 1518.

The LCL base tuning and matching unit 1518 serves to filter out harmonics or other unwanted frequencies and match the impedance of the LF inverter 1516 to a wireless power induction coil. As shown, the LCL base tuning and matching unit 1518 is configured to receive the LF signal from the LF inverter 1516, and to output tuned/matched signal to the base pad 1520.

The base pad 1520 serves to transmit wireless charging power, via the wireless connection 1508, to the vehicle side 1504. In some embodiments, the base pad 1520 can include the base induction coil 304 (FIG. 3). As shown, the base pad 1520 receives the tuned/matched LF signal through the LCL base tuning and matching circuit 1518 and generates the wireless charging field for the wireless connection 1508. In some embodiments, the base pad 1520 can include transmit circuitry configured to provide the modulated-amplitude wireless connection 1508 to the vehicle side 1504 as described above with respect to FIGS. 1-3.

The vehicle side 1504 serves to receive charging power, via the wired connection 1506 and/or the wireless connection 1508, from the infrastructure side 1502. As shown in FIG. 15, the vehicle side 1504 includes a wired path 1522 including a main electromagnetic interference (EMI) filter 1524. The vehicle side 1504 further includes a wireless path 1532 including a vehicle pad 1534, a vehicle tuning circuit 1536, and a rectifier and filter 1538. The vehicle side 1504 further includes a combined path 1544 including a PFC unit 1526, a bulk capacitance 1528, an isolated DC-DC converter 1530, and the battery 1542.

In various embodiments, the wired path 1522, the wireless path 1532, or both, can be active at any given time. Thus, although various components in the combined path 1544 can be described herein as receiving power from more than once source, in certain embodiments, only one source is active at the same time. In other embodiments, a plurality of sources are active at the same time.

In various embodiments, the vehicle side 1504 can include one or more components of the wireless power transfer system 150, described above with respect to FIG. 1. For example, the vehicle side 1504 can include the battery unit 118, the electric vehicle induction coil 116, the electric vehicle wireless charging system 114, and the antenna 150. The vehicle side 1504 can be configured to receive wireless charging power, via the wireless connection 1508, as described above with respect to FIGS. 1-3. Although certain exemplary components are shown in FIG. 15, a person having ordinary skill in the art will appreciate that certain components can be added, omitted, and/or reordered.

In the wired path 1522, the main EMI filter 1524 serves to rectify the incoming wired connection 1506 and to filter frequencies caused by rectification (or other causes) that can emit unwanted electromagnetic interference. As shown, the main EMI filter 1524 receives an AC signal via the wired connection 1506 and provides a rectified signal to the PFC unit 1526.

In the wireless path 1532, the vehicle pad 1534 is configured to receive wireless charging power, via the wireless connection 1508, from the infrastructure side 1502. In some embodiments, the vehicle pad 1534 can include the electric vehicle induction coil 316 (FIG. 3). As shown, the vehicle pad 1534 receives the wireless charging field from the wireless connection 1508 and provides an output signal to the series vehicle tuning module 1536.

The vehicle tuning circuit 1536 serves to tune the impedance of the wireless path 1532 for efficient wireless power transfer. In the illustrated embodiment, the vehicle tuning circuit 1536 is configured as a series LC circuit. In other embodiments, the vehicle tuning circuit 1536 can be configured as a parallel LC circuit. As shown, the vehicle tuning circuit 1536 receives an input signal from the vehicle pad 1534 and provides an output signal to the rectifier and filter 1538.

The rectifier and filter 1538 serves to provide rectified power from an LF signal. The rectifier and filter 1538 can generate the rectified signal via rectification. The rectifier and filter 1538 is further configured to filter the rectified signal. As shown, the decoupling rectifier and filter 1538 receives the LF input signal from the vehicle tuning circuit 1536, and provides a rectified signal to the PFC unit 1526.

In the combined path 1544, the PFC unit 1526 serves to reduce harmonic content in currents of the AC source 1510 and maintain power quality. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In an embodiment, the PFC unit 1526 is configured as both a PFC and a wave-shaping unit. As shown, the PFC unit 1526 receives the signal from the main EMI filter 1524, and provides the bulk capacitance 1528 with a power-factor corrected signal.

The bulk capacitance 1528 serves to smooth the signal entering the isolated DC-DC converter 1530 and to counteract inductive effects of other components. In various embodiments, the bulk capacitance 1528 can be incorporated into the PFC unit 1526 and/or the isolated DC-DC converter 1530.

The DC-DC converter 1530 serves to isolate the battery 1542 from the mains power from the AC source 1510. The DC-DC converter 1530 can include, for example, a pair of inductive coils. In various embodiments, the DC-DC converter 1530 can be configured to adjust a voltage level coming from the wired connection 1506, as appropriate for charging the battery 1542.

Figure 16:
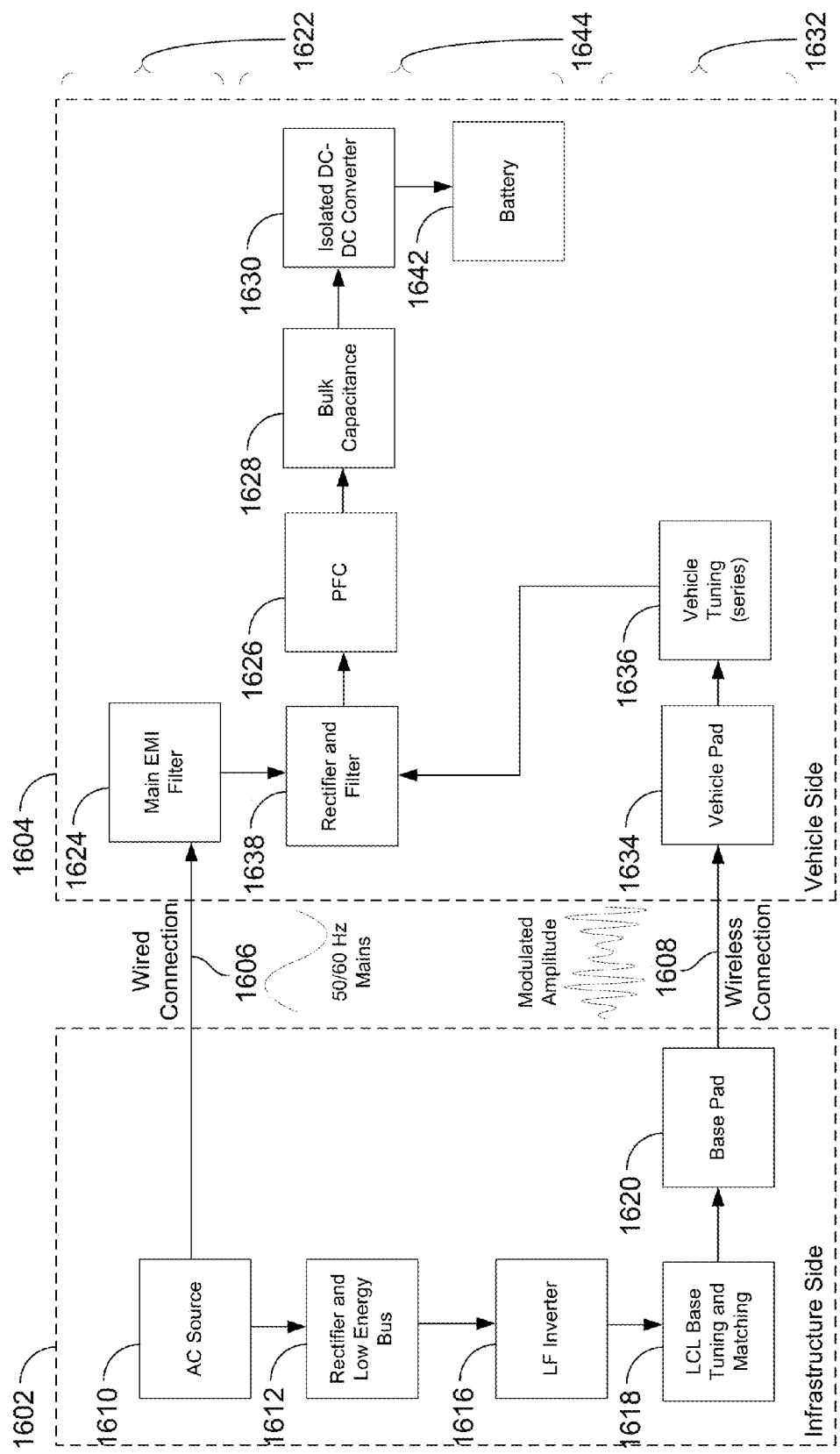
FIG. 16 is a functional block diagram showing exemplary components of another dual-source power transfer system.

FIG. 16 is a functional block diagram showing exemplary components of another dual-source power transfer system 1600. The dual-source power transfer system 1600 includes an infrastructure side 1602 and a vehicle side 1604, wherein power can be transferred from the infrastructure side 1602 to the vehicle side 1604 via a wired connection 1606 or a wireless connection 1608 connected by a wired connection 1606 and a wireless connection 1608, or both. In some embodiments, the wired connection 1606 can include a 50/60 Hz AC mains signal. The wireless connection 1608 can include a modulated amplitude inductive charging field. Although various aspects of the infrastructure side 1602 and the vehicle side 1604 may be discussed herein as cohesive units, a person having ordinary skill in the art will appreciate that either of the infrastructure side 1602 and the vehicle side 1604 can be divided into one or more separate components or subsystems, and individual components or subsystems discussed can be implemented separately or can be integrated.

The infrastructure side 1602 serves to provide charging power, via the wired connection 1606 and/or the wireless connection 1608, to the vehicle side 1604. As shown in FIG. 16, the infrastructure side 1604 includes an AC power source 1610, a rectifier and low energy bus 1612, a low-frequency (LF) inverter 1616, an LCL base tuning and matching unit 1618, and a base pad 1620. In various embodiments, the infrastructure side 1602 can include one or more components of the wireless power transfer system 160, described above with respect to FIG. 1. For example, the infrastructure side 1602 can include the local distribution center 160 and the base wireless charging system 162a. The infrastructure side 1602 can be configured to transmit wireless charging power, via the wireless connection 1608, as described above with respect to FIGS. 2-3. Although certain exemplary components are shown in FIG. 16, a person having ordinary skill in the art will appreciate that certain components can be added, omitted, and/or reordered.

The AC source 1610 serves to provide AC power to the wired connection 1606, and to one or more components driving the wireless connection 1608. As shown, the AC source 1610 provides power to the rectifier and low energy bus 1612. The AC source 1610 can include, for example, the local distribution center 160 (FIG. 1) and/or the power backbone 162 (FIG. 1). In some embodiments, the source 1610 can include a DC source.

The rectifier and low energy bus 1612 serves to provide a modulated power signal from the AC source 1610 signal. The rectifier and low energy bus 1612 can generate the modulated power signal via rectification. As shown, the rectifier and low energy bus 1612 receives the AC input signal from the AC source 1610, and provides a rectified power output on a low energy bus to the LF inverter 1616.

The LF inverter 1616 serves to generate the low-frequency signal for inductive field generation. In an embodiment, the LF inverter 1616 can be referred to as an LF converter. In various embodiments, the LF inverter 1616 can receive a signal from the rectifier and low energy bus 1612 and output a low-frequency signal to the LCL base tuning and matching unit 1618.

The LCL base tuning and matching unit 1618 serves to filter out harmonics or other unwanted frequencies and match the impedance of the LF inverter 1616 to a wireless power induction coil. As shown, the LCL base tuning and matching unit 1618 is configured to receive the LF signal from the LF inverter 1616, and to output tuned/matched signal to the base pad 1620.

The base pad 1620 serves to transmit wireless charging power, via the wireless connection 1608, to the vehicle side 1604. In some embodiments, the base pad 1620 can include the base induction coil 304 (FIG. 3). As shown, the base pad 1620 receives the tuned/matched LF signal through the LCL base tuning and matching circuit 1618 and generates the wireless charging field for the wireless connection 1608. In some embodiments, the base pad 1620 can include transmit circuitry configured to provide the modulated-amplitude wireless connection 1608 to the vehicle side 1604 as described above with respect to FIGS. 1-3.

The vehicle side 1604 serves to receive charging power, via the wired connection 1606 and/or the wireless connection 1608, from the infrastructure side 1602. As shown in FIG. 16, the vehicle side 1604 includes a wired path 1622 including a main electromagnetic interference (EMI) filter 1624. The vehicle side 1604 further includes a wireless path 1632 including a vehicle pad 1634, and a vehicle tuning circuit 1636. The vehicle side 1604 further includes a combined path 1644 including a rectifier and filter 1638, a PFC unit 1626, a bulk capacitance 1628, an isolated DC-DC converter 1630, and the battery 1642.

In various embodiments, the wired path 1622, the wireless path 1632, or both, can be active at any given time. Thus, although various components in the combined path 1644 can be described herein as receiving power from more than once source, in certain embodiments, only one source is active at the same time. In other embodiments, a plurality of sources are active at the same time.

In various embodiments, the vehicle side 1604 can include one or more components of the wireless power transfer system 160, described above with respect to FIG. 1. For example, the vehicle side 1604 can include the battery unit 118, the electric vehicle induction coil 116, the electric vehicle wireless charging system 114, and the antenna 160. The vehicle side 1604 can be configured to receive wireless charging power, via the wireless connection 1608, as described above with respect to FIGS. 1-3. Although certain exemplary components are shown in FIG. 16, a person having ordinary skill in the art will appreciate that certain components can be added, omitted, and/or reordered.

In the wired path 1622, the main EMI filter 1624 serves to filter frequencies caused by that can emit unwanted electromagnetic interference. As shown, the main EMI filter 1624 receives an AC signal via the wired connection 1606 and provides a filtered signal to the rectifier and filter 1638.

In the wireless path 1632, the vehicle pad 1634 is configured to receive wireless charging power, via the wireless connection 1608, from the infrastructure side 1602. In some embodiments, the vehicle pad 1634 can include the electric vehicle induction coil 316 (FIG. 3). As shown, the vehicle pad 1634 receives the wireless charging field from the wireless connection 1608 and provides an output signal to the series vehicle tuning module 1636.

The vehicle tuning circuit 1636 serves to tune the impedance of the wireless path 1632 for efficient wireless power transfer. In the illustrated embodiment, the vehicle tuning circuit 1636 is configured as a series LC circuit. In other embodiments, the vehicle tuning circuit 1636 can be configured as a parallel LC circuit. As shown, the vehicle tuning circuit 1636 receives an input signal from the vehicle pad 1634 and provides an output signal to the rectifier and filter 1638.

In the combined path 1644, the rectifier and filter 1638 serves to provide rectified power from an AC or LF signal. The rectifier and filter 1638 can generate the rectified signal via rectification. The rectifier and filter 1638 is further configured to filter the rectified signal. As shown, the rectifier and filter 1638 receives the LF input signal from the vehicle tuning circuit 1636, the filtered AC signal from the main EMI filter 1624, and provides a rectified signal to the PFC unit 1626.

The PFC unit 1626 serves to reduce harmonic content in currents of the AC source 1610 and maintain power quality. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In an embodiment, the PFC unit 1626 is configured as both a PFC and a wave-shaping unit. As shown, the PFC unit 1626 receives the signal from the main EMI filter 1624, and provides the bulk capacitance 1628 with a power-factor corrected signal.

The bulk capacitance 1628 serves to smooth the signal entering the isolated DC-DC converter 1630 and to counteract inductive effects of other components. In various embodiments, the bulk capacitance 1628 can be incorporated into the PFC unit 1626 and/or the isolated DC-DC converter 1630.

The DC-DC converter 1630 serves to isolate the battery 1642 from the mains power from the AC source 1610. The DC-DC converter 1630 can include, for example, a pair of inductive coils. In various embodiments, the DC-DC converter 1630 can be configured to adjust a voltage level coming from the wired connection 1606, as appropriate for charging the battery 1642.

Figure 17:
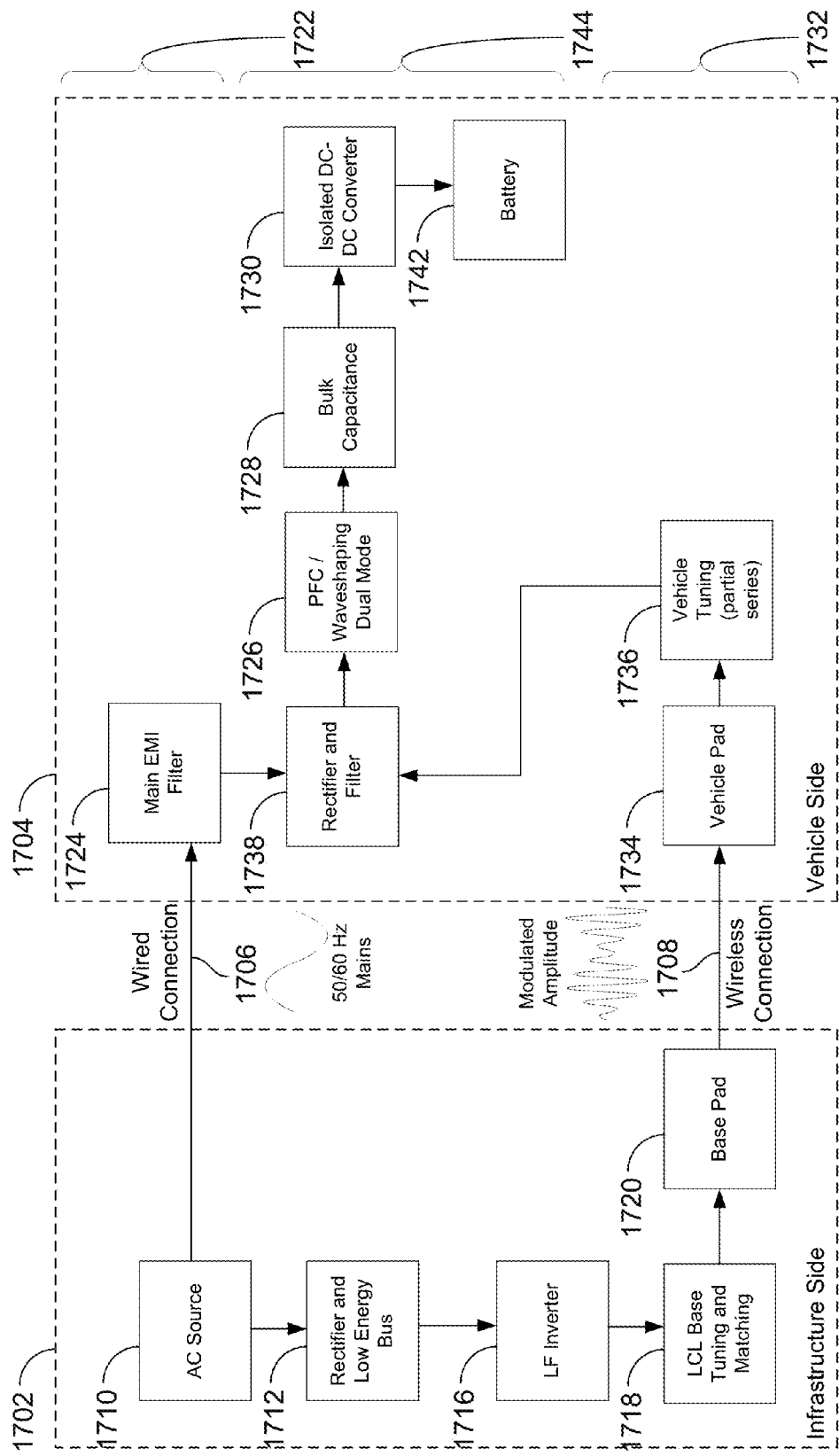
FIG. 17 is a functional block diagram showing exemplary components of another dual-source power transfer system.

FIG. 17 is a functional block diagram showing exemplary components of another dual-source power transfer system 1700. The dual-source power transfer system 1700 includes an infrastructure side 1702 and a vehicle side 1704, wherein power can be transferred from the infrastructure side 1702 to the vehicle side 1704 via a wired connection 1706 or a wireless connection 1708 connected by a wired connection 1706 and a wireless connection 1708, or both. In some embodiments, the wired connection 1706 can include a 50/60 Hz AC mains signal. The wireless connection 1708 can include a modulated amplitude inductive charging field. Although various aspects of the infrastructure side 1702 and the vehicle side 1704 may be discussed herein as cohesive units, a person having ordinary skill in the art will appreciate that either of the infrastructure side 1702 and the vehicle side 1704 can be divided into one or more separate components or subsystems, and individual components or subsystems discussed can be implemented separately or can be integrated.

The infrastructure side 1702 serves to provide charging power, via the wired connection 1706 and/or the wireless connection 1708, to the vehicle side 1704. As shown in FIG. 17, the infrastructure side 1704 includes an AC power source 1710, a rectifier and low energy bus 1712, a low-frequency (LF) inverter 1716, an LCL base tuning and matching unit 1718, and a base pad 1720. In various embodiments, the infrastructure side 1702 can include one or more components of the wireless power transfer system 170, described above with respect to FIG. 1. For example, the infrastructure side 1702 can include the local distribution center 170 and the base wireless charging system 172a. The infrastructure side 1702 can be configured to transmit wireless charging power, via the wireless connection 1708, as described above with respect to FIGS. 2-3. Although certain exemplary components are shown in FIG. 17, a person having ordinary skill in the art will appreciate that certain components can be added, omitted, and/or reordered.

The AC source 1710 serves to provide AC power to the wired connection 1706, and to one or more components driving the wireless connection 1708. As shown, the AC source 1710 provides power to the rectifier and low energy bus 1712. The AC source 1710 can include, for example, the local distribution center 170 (FIG. 1) and/or the power backbone 172 (FIG. 1). In some embodiments, the source 1710 can include a DC source.

The rectifier and low energy bus 1712 serves to provide a modulated power signal from the AC source 1710 signal. The rectifier and low energy bus 1712 can generate the modulated power signal via rectification. As shown, the rectifier and low energy bus 1712 receives the AC input signal from the AC source 1710, and provides a rectified power output on a low energy bus to the LF inverter 1716.

The LF inverter 1716 serves to generate the low-frequency signal for inductive field generation. In an embodiment, the LF inverter 1716 can be referred to as an LF converter. In various embodiments, the LF inverter 1716 can receive a signal from the rectifier and low energy bus 1712 and output a low-frequency signal to the LCL base tuning and matching unit 1718.

The LCL base tuning and matching unit 1718 serves to filter out harmonics or other unwanted frequencies and match the impedance of the LF inverter 1716 to a wireless power induction coil. As shown, the LCL base tuning and matching unit 1718 is configured to receive the LF signal from the LF inverter 1716, and to output tuned/matched signal to the base pad 1720.

The base pad 1720 serves to transmit wireless charging power, via the wireless connection 1708, to the vehicle side 1704. In some embodiments, the base pad 1720 can include the base induction coil 304 (FIG. 3). As shown, the base pad 1720 receives the tuned/matched LF signal through the LCL base tuning and matching circuit 1718 and generates the wireless charging field for the wireless connection 1708. In some embodiments, the base pad 1720 can include transmit circuitry configured to provide the modulated-amplitude wireless connection 1708 to the vehicle side 1704 as described above with respect to FIGS. 1-3.

The vehicle side 1704 serves to receive charging power, via the wired connection 1706 and/or the wireless connection 1708, from the infrastructure side 1702. As shown in FIG. 17, the vehicle side 1704 includes a wired path 1722 including a main electromagnetic interference (EMI) filter 1724. The vehicle side 1704 further includes a wireless path 1732 including a vehicle pad 1734, and a vehicle tuning circuit 1736. The vehicle side 1704 further includes a combined path 1744 including a rectifier and filter 1738, a dual-mode PFC and waveshaping controller 1726, a bulk capacitance 1728, an isolated DC-DC converter 1730, and the battery 1742.

In various embodiments, the wired path 1722, the wireless path 1732, or both, can be active at any given time. Thus, although various components in the combined path 1744 can be described herein as receiving power from more than once source, in certain embodiments, only one source is active at the same time. In other embodiments, a plurality of sources are active at the same time.

In various embodiments, the vehicle side 1704 can include one or more components of the wireless power transfer system 170, described above with respect to FIG. 1. For example, the vehicle side 1704 can include the battery unit 118, the electric vehicle induction coil 116, the electric vehicle wireless charging system 114, and the antenna 170. The vehicle side 1704 can be configured to receive wireless charging power, via the wireless connection 1708, as described above with respect to FIGS. 1-3. Although certain exemplary components are shown in FIG. 17, a person having ordinary skill in the art will appreciate that certain components can be added, omitted, and/or reordered.

In the wired path 1722, the main EMI filter 1724 serves to filter frequencies caused by that can emit unwanted electromagnetic interference. As shown, the main EMI filter 1724 receives an AC signal via the wired connection 1706 and provides a filtered signal to the rectifier and filter 1738.

In the wireless path 1732, the vehicle pad 1734 is configured to receive wireless charging power, via the wireless connection 1708, from the infrastructure side 1702. In some embodiments, the vehicle pad 1734 can include the electric vehicle induction coil 316 (FIG. 3). As shown, the vehicle pad 1734 receives the wireless charging field from the wireless connection 1708 and provides an output signal to the partial series vehicle tuning module 1736.

The vehicle tuning circuit 1736 serves to tune the impedance of the wireless path 1732 for efficient wireless power transfer. In the illustrated embodiment, the vehicle tuning circuit 1736 is configured as a parallel with partial series LC circuit. In other embodiments, the vehicle tuning circuit 1736 can be configured as a parallel LC circuit or a series LC circuit. As shown, the vehicle tuning circuit 1736 receives an input signal from the vehicle pad 1734 and provides an output signal to the rectifier and filter 1738.

In the combined path 1744, the rectifier and filter 1738 serves to provide rectified power from an AC or LF signal. The rectifier and filter 1738 can generate the rectified signal via rectification. The rectifier and filter 1738 is further configured to filter the rectified signal. As shown, the rectifier and filter 1738 receives the LF input signal from the vehicle tuning circuit 1736, the filtered AC signal from the main EMI filter 1724, and provides a rectified signal to the dual-mode PFC and waveshaping controller 1726.

The dual-mode PFC and waveshaping controller 1726 serves to reduce harmonic content in currents of the AC source 1710 and maintain power quality. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In an embodiment, the dual-mode PFC and waveshaping controller 1726 is configured as both a PFC and a wave-shaping unit. As shown, the dual-mode PFC and waveshaping controller 1726 receives the signal from the main EMI filter 1724, and provides the bulk capacitance 1728 with a power-factor corrected signal.

The bulk capacitance 1728 serves to smooth the signal entering the isolated DC-DC converter 1730 and to counteract inductive effects of other components. In various embodiments, the bulk capacitance 1728 can be incorporated into the dual-mode PFC and waveshaping controller 1726 and/or the isolated DC-DC converter 1730.

The DC-DC converter 1730 serves to isolate the battery 1742 from the mains power from the AC source 1710. The DC-DC converter 1730 can include, for example, a pair of inductive coils. In various embodiments, the DC-DC converter 1730 can be configured to adjust a voltage level coming from the wired connection 1706, as appropriate for charging the battery 1742.

Figure 18:
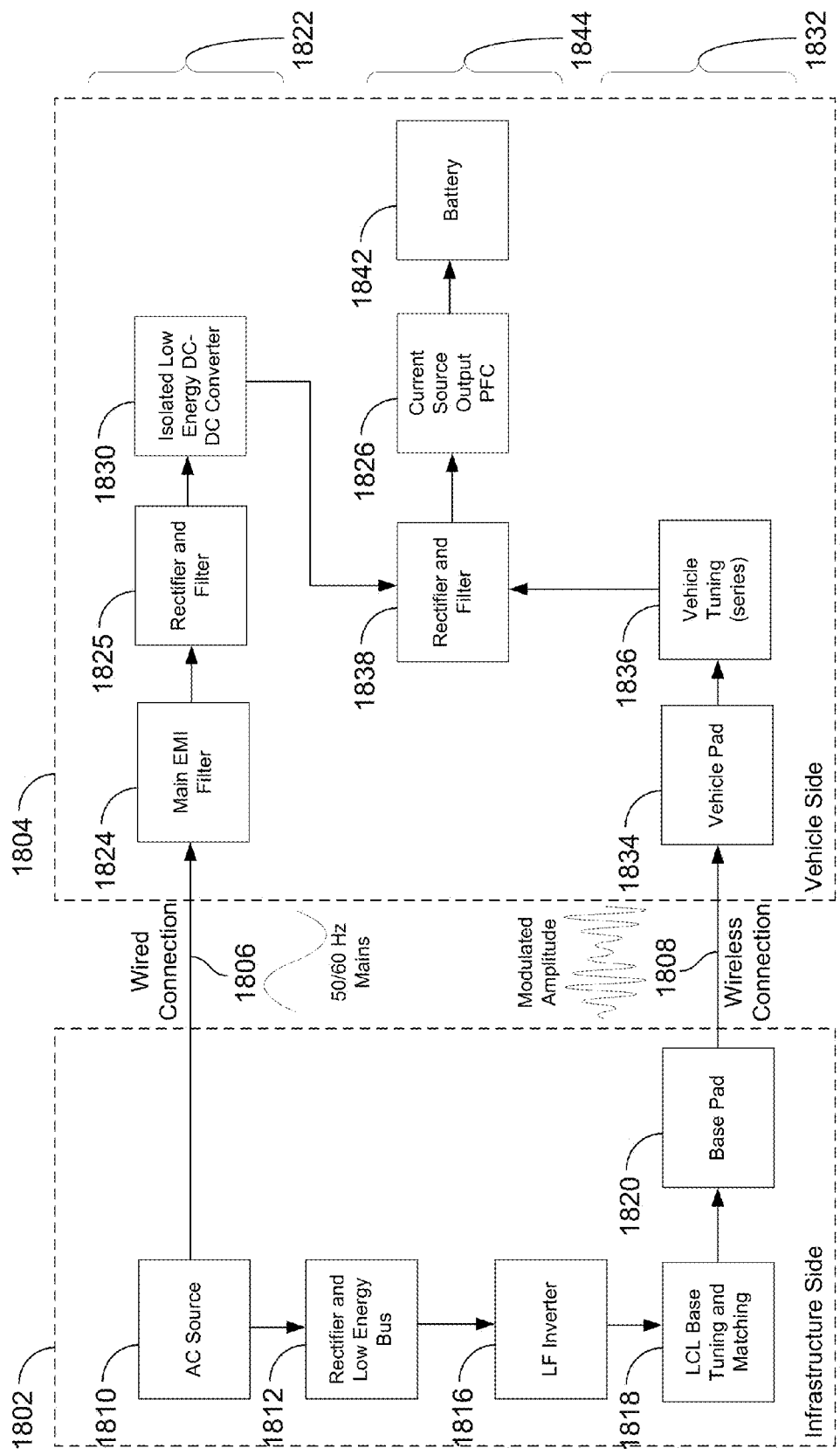
FIG. 18 is a functional block diagram showing exemplary components of another dual-source power transfer system.

FIG. 18 is a functional block diagram showing exemplary components of another dual-source power transfer system 1800. The dual-source power transfer system 1800 includes an infrastructure side 1802 and a vehicle side 1804, wherein power can be transferred from the infrastructure side 1802 to the vehicle side 1804 via a wired connection 1806 or a wireless connection 1808 connected by a wired connection 1806 and a wireless connection 1808, or both. In some embodiments, the wired connection 1806 can include a 50/60 Hz AC mains signal. The wireless connection 1808 can include a modulated amplitude inductive charging field. Although various aspects of the infrastructure side 1802 and the vehicle side 1804 may be discussed herein as cohesive units, a person having ordinary skill in the art will appreciate that either of the infrastructure side 1802 and the vehicle side 1804 can be divided into one or more separate components or subsystems, and individual components or subsystems discussed can be implemented separately or can be integrated.

The infrastructure side 1802 serves to provide charging power, via the wired connection 1806 and/or the wireless connection 1808, to the vehicle side 1804. As shown in FIG. 18, the infrastructure side 1804 includes an AC power source 1810, a rectifier and low energy bus 1812, a low-frequency (LF) inverter 1816, an LCL base tuning and matching unit 1818, and a base pad 1820. In various embodiments, the infrastructure side 1802 can include one or more components of the wireless power transfer system 180, described above with respect to FIG. 1. For example, the infrastructure side 1802 can include the local distribution center 180 and the base wireless charging system 182*a*. The infrastructure side 1802 can be configured to transmit wireless charging power, via the wireless connection 1808, as described above with respect to FIGS. 2-3. Although certain exemplary components are shown in FIG. 18, a person having ordinary skill in the art will appreciate that certain components can be added, omitted, and/or reordered.

The AC source 1810 serves to provide AC power to the wired connection 1806, and to one or more components driving the wireless connection 1808. As shown, the AC source 1810 provides power to the rectifier and low energy bus 1812. The AC source 1810 can include, for example, the local distribution center 180 (FIG. 1) and/or the power backbone 182 (FIG. 1). In some embodiments, the source 1810 can include a DC source.

The rectifier and low energy bus 1812 serves to provide a modulated power signal from the AC source 1810 signal. The rectifier and low energy bus 1812 can generate the modulated power signal via rectification. As shown, the rectifier and low energy bus 1812 receives the AC input signal from the AC source 1810, and provides a rectified power output on a low energy bus to the LF inverter 1816.

The LF inverter 1816 serves to generate the low-frequency signal for inductive field generation. In an embodiment, the LF inverter 1816 can be referred to as an LF converter. In various embodiments, the LF inverter 1816 can receive a signal from the rectifier and low energy bus 1812 and output a low-frequency signal to the LCL base tuning and matching unit 1818.

The LCL base tuning and matching unit 1818 serves to filter out harmonics or other unwanted frequencies and match the impedance of the LF inverter 1816 to a wireless power induction coil. As shown, the LCL base tuning and matching unit 1818 is configured to receive the LF signal from the LF inverter 1816, and to output tuned/matched signal to the base pad 1820.

The base pad 1820 serves to transmit wireless charging power, via the wireless connection 1808, to the vehicle side 1804. In some embodiments, the base pad 1820 can include the base induction coil 304 (FIG. 3). As shown, the base pad 1820 receives the tuned/matched LF signal through the LCL base tuning and matching circuit 1818 and generates the wireless charging field for the wireless connection 1808. In some embodiments, the base pad 1820 can include transmit circuitry configured to provide the modulated-amplitude wireless connection 1808 to the vehicle side 1804 as described above with respect to FIGS. 1-3.

The vehicle side 1804 serves to receive charging power, via the wired connection 1806 and/or the wireless connection 1808, from the infrastructure side 1802. As shown in FIG. 18, the vehicle side 1804 includes a wired path 1822 including a main electromagnetic interference (EMI) filter 1824, a rectifier and filter 1825, and an isolated low-energy DC-DC converter 1830. The vehicle side 1804 further includes a wireless path 1832 including a vehicle pad 1834, and a vehicle tuning circuit 1836. The vehicle side 1804 further includes a combined path 1844 including a rectifier and filter 1838, a current-source output PFC unit 1826, and the battery 1842.

In various embodiments, the wired path 1822, the wireless path 1832, or both, can be active at any given time. Thus, although various components in the combined path 1844 can be described herein as receiving power from more than once source, in certain embodiments, only one source is active at the same time. In other embodiments, a plurality of sources are active at the same time.

In various embodiments, the vehicle side 1804 can include one or more components of the wireless power transfer system 180, described above with respect to FIG. 1. For example, the vehicle side 1804 can include the battery unit 118, the electric vehicle induction coil 116, the electric vehicle wireless charging system 114, and the antenna 180. The vehicle side 1804 can be configured to receive wireless charging power, via the wireless connection 1808, as described above with respect to FIGS. 1-3. Although certain exemplary components are shown in FIG. 18, a person having ordinary skill in the art will appreciate that certain components can be added, omitted, and/or reordered.

In the wired path 1822, the main EMI filter 1824 serves to filter frequencies caused by that can emit unwanted electromagnetic interference. As shown, the main EMI filter 1824 receives an AC signal via the wired connection 1806 and provides a filtered signal to the rectifier and filter 1825.

The rectifier and filter 1825 serves to provide rectified power from an AC signal. The rectifier and filter 1825 can generate the rectified signal via rectification. The rectifier and filter 1825 is further configured to filter the rectified signal. As shown, the rectifier and filter 1825 receives the filtered AC signal from the main EMI filter 1824 and provides a rectified signal to the isolated low-energy DC-DC converter 1830.

The DC-DC converter 1830 serves to isolate the battery 1842 from the mains power from the AC source 1810. The DC-DC converter 1830 can include, for example, a pair of inductive coils. In various embodiments, the DC-DC converter 1830 can be configured to as a low-energy DC-DC converter. As shown, the DC-DC converter 1830 is configured to receive the rectified signal from the rectifier and filter 1825, and provide isolated low-energy DC power to the rectifier and filter 1838.

In the wireless path 1832, the vehicle pad 1834 is configured to receive wireless charging power, via the wireless connection 1808, from the infrastructure side 1802. In some embodiments, the vehicle pad 1834 can include the electric vehicle induction coil 316 (FIG. 3). As shown, the vehicle pad 1834 receives the wireless charging field from the wireless connection 1808 and provides an output signal to the partial series vehicle tuning module 1836.

The vehicle tuning circuit 1836 serves to tune the impedance of the wireless path 1832 for efficient wireless power transfer. In the illustrated embodiment, the vehicle tuning circuit 1836 is configured as a parallel with partial series LC circuit. In other embodiments, the vehicle tuning circuit 1836 can be configured as a parallel LC circuit or a series LC circuit. As shown, the vehicle tuning circuit 1836 receives an input signal from the vehicle pad 1834 and provides an output signal to the rectifier and filter 1838.

In the combined path 1844, the rectifier and filter 1838 serves to provide rectified power from a rectified or LF signal. The rectifier and filter 1838 can generate the rectified signal via rectification. The rectifier and filter 1838 is further configured to filter the rectified signal. As shown, the rectifier and filter 1838 receives the LF input signal from the vehicle tuning circuit 1836, the rectified signal from the isolated low-energy DC-DC converter 1830, and provides a rectified signal to the current-source output PFC unit 1826.

The current-source output PFC unit 1826 serves to reduce harmonic content in currents of the AC source 1810 and maintain power quality. Reducing current harmonics content may be a requirement for compliance of electric appliances consuming power above a specified limit according to international or national standards (e.g., IEC 61000-3-2). Reducing AC current harmonics can help energy suppliers to reduce excessive power losses in the power grid and to maintain mains voltage substantially sinusoidal. In an embodiment, the current-source output PFC unit 1826 is configured as both a PFC and a wave-shaping unit. In the illustrated embodiment, the PFC unit 1826 is configured to provide a current-source output. As shown, the current-source output PFC unit 1826 receives the rectified signal from the rectifier and filter 1838, and provides the battery 1842 with a power-factor corrected current-source output.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus configured to receive wireless charging power and wired charging power, comprising:
 a battery;
 a wireless connection configured to receive wireless charging power, and to charge the battery along a wireless charging path;
 a wired connection configured to receive wired charging power, and to charge the battery along a wired charging path,
 wherein the wired charging path and the wireless charging path comprise one or more shared components in a combined charging path comprising a rectifier.

2. The apparatus of claim 1, wherein:
 the wireless charging path comprises:
  a coil configured to receive wireless charging power; and
  a series tuning circuit configured to tune the coil;
 the wired charging path comprises:
  a first rectifier configured to receive wired charging power and to provide a first rectified output;
  a power-factor correction (PFC) module configured to receive the first rectified output from the electromagnetic interference (EMI) filter and rectifier, and further configured to provide a power-factor corrected output; and
  an isolated DC-DC converter configured to receive the power-factor corrected output and to provide an isolated DC output; and
 the combined charging path further comprises:
  a decoupling rectifier configured to receive the wireless charging power from the coil, to receive the isolated output, and to provide a second rectified output to the battery.

3. The apparatus of claim 1, wherein:
 the wireless charging path comprises:
  a coil configured to receive wireless charging power;
  a parallel tuning circuit configured to tune the coil;
  a decoupling rectifier configured to receive the wireless charging power from the coil, and to provide a second rectified output; and
  an output filter configured to filter the second rectified output and to provide a filtered output;
 the wired charging path comprises:
  a first rectifier configured to receive wired charging power and to provide a first rectified output; and
  a power-factor correction (PFC) module configured to receive the first rectified output from the electromagnetic interference (EMI) filter and rectifier, and further configured to provide a power-factor corrected output; and
 the combined charging path further comprises:
  an isolated DC-DC converter configured to receive the power-factor corrected output, to receive the filtered output, and to provide an isolated DC output to the battery.

4. The apparatus of claim 1, wherein:
 the wireless charging path comprises:
  a coil configured to receive wireless charging power;
  a series tuning circuit configured to tune the coil; and
  a decoupling rectifier configured to receive the wireless charging power from the coil, and to provide a second rectified output;
 the wired charging path comprises:
  a first rectifier configured to receive wired charging power and to provide a first rectified output; and
  a power-factor correction (PFC) module configured to receive the first rectified output from the electromagnetic interference (EMI) filter and rectifier, and further configured to provide a power-factor corrected output; and
 the combined charging path further comprises:
  an isolated DC-DC converter configured to receive the power-factor corrected output, to receive the second rectified output, and to provide an isolated DC output to the battery.

5. The apparatus of claim 1, wherein:
 the wireless charging path comprises:
  a coil configured to receive wireless charging power; and
  a parallel and partial series tuning circuit configured to tune the coil;
 the combined charging path further comprises:
  a first rectifier configured to receive wired charging power through the wired connection, to receive the wireless charging power from the coil, and to provide a first rectified output;
  a power-factor correction (PFC) module configured to receive the first rectified output from the electromagnetic interference (EMI) filter and rectifier, and further configured to provide a power-factor corrected output; and
  an isolated DC-DC converter configured to receive the power-factor corrected output, to receive the second rectified output, and to provide an isolated DC output to the batter.

6. The apparatus of claim 1, wherein:
 the wireless charging path comprises:
  a coil configured to receive wireless charging power;
  a decoupling rectifier configured to receive the wireless charging power from the coil, and to provide a second rectified output; and
  a wave-shaping controller configured to shape the second rectified output and to provide a wave-shaped output;
 the wired charging path comprises:
  a first rectifier configured to receive wired charging power and to provide a first rectified output; and
  a power-factor correction (PFC) module configured to receive the first rectified output from the electromagnetic interference (EMI) filter and rectifier, and further configured to provide a power-factor corrected output; and
 the combined charging path further comprises:
  an isolated DC-DC converter configured to receive the power-factor corrected output, to receive the wave-shaped output, and to provide an isolated DC output to the battery.

7. The apparatus of claim 1, wherein:
 the wireless charging path comprises:
  a coil configured to receive wireless charging power;
  a parallel tuning circuit configured to tune the coil; and
  a decoupling rectifier configured to receive the wireless charging power from the coil, and to provide a second rectified output;
 the wired charging path comprises:
  a first rectifier configured to receive wired charging power and to provide a first rectified output; and
 the combined charging path further comprises:
  a dual-mode power-factor correction (PFC) and wave-shaping module configured to receive the first rectified output and the second rectified output, and further configured to provide a power-factor corrected output; and an isolated DC-DC converter configured to receive the power-factor corrected output, to receive the wave-shaped output, and to provide an isolated DC output to the battery.

8. The apparatus of claim 1, wherein:
the wireless charging path comprises:
  a coil configured to receive wireless charging power;
  a series tuning circuit configured to tune the coil; and
  a decoupling rectifier configured to receive the wireless charging power from the coil, and to provide a second rectified output;
the wired charging path comprises:
  a first rectifier configured to receive wired charging power and to provide a first rectified output; and
the combined charging path further comprises:
  a power-factor correction (PFC) module configured to receive the first rectified output and the second rectified output, and further configured to provide a power-factor corrected output;
  an isolated DC-DC converter configured to receive the power-factor corrected output, to receive the wave-shaped output, and to provide an isolated DC output to the battery.

9. The apparatus of claim 1, wherein:
the wireless charging path comprises:
  a coil configured to receive wireless charging power; and
  a series tuning circuit configured to tune the coil; and
the combined charging path further comprises:
  a rectifier configured to receive wired charging power from the wired connection, to receive the wireless charging power from the coil, and to provide a first rectified output;
  a power-factor correction (PFC) module configured to receive the first rectified output, and further configured to provide a power-factor corrected output; and
  an isolated DC-DC converter configured to receive the power-factor corrected output, to receive the wave-shaped output, and to provide an isolated DC output to the battery.

10. The apparatus of claim 1, wherein:
the wireless charging path comprises:
  a coil configured to receive wireless charging power; and
  a parallel and partial series tuning circuit configured to tune the coil; and
the combined charging path further comprises:
  a rectifier configured to receive wired charging power from the wired connection, to receive the wireless charging power from the coil, and to provide a first rectified output;
  a dual-mode power-factor correction (PFC) and wave-shaping module configured to receive the first rectified output, and further configured to provide a power-factor corrected output; and
  an isolated DC-DC converter configured to receive the power-factor corrected output, to receive the wave-shaped output, and to provide an isolated DC output to the battery.

11. The apparatus of claim 1, wherein:
the wireless charging path comprises:
  a coil configured to receive wireless charging power; and
  a series tuning circuit configured to tune the coil;
the wired charging path comprises:
  a first rectifier configured to receive wired charging power and to provide a first rectified output; and an isolated DC-DC converter configured to receive the first rectified output, and to provide an isolated DC output; and
the combined charging path further comprises:
  a second rectifier configured to receive the wireless charging power from the coil, to receive the isolated DC output, and to provide a second rectified output; and
  a current-source power-factor correction (PFC) module configured to receive the second rectified output, and further configured to provide a current-source output to the battery.

12. The apparatus of claim 1, wherein the wireless charging power comprises a modulated amplitude.

13. The apparatus of claim 1, further comprising one or more of: a parallel tuning circuit configured to tune the coil, an electromagnetic interference (EMI) filter configured to filter the wired charging power, a bulk capacitance configured to filter a power-factor corrected output, and an output filter configured to filter a rectified output.

14. An apparatus for receiving wireless charging power and wired charging power, comprising:
means for storing charging power;
means for receiving wireless charging power, to be stored in the means for storing charging power, along a wireless charging path;
means for receiving wired charging power, to be stored in the means for storing charging power, along a wired charging path;
wherein the wired charging path and the wireless charging path comprise one or more shared components in a combined charging path comprising a rectifier.

15. The apparatus of claim 14, wherein:
means for receiving wireless charging power along the wireless charging path comprises:
  a coil configured to receive wireless charging power; and
  a series tuning circuit configured to tune the coil;
means for receiving wired charging power along the wired charging path comprises:
  a first rectifier configured to receive wired charging power and to provide a first rectified output;
  a power-factor correction (PFC) module configured to receive the first rectified output from the electromagnetic interference (EMI) filter and rectifier, and further configured to provide a power-factor corrected output; and
  an isolated DC-DC converter configured to receive the power-factor corrected output and to provide an isolated DC output; and
the combined charging path further comprises:
  a decoupling rectifier configured to receive the wireless charging power from the coil, to receive the isolated output, and to provide a second rectified output to the means for storing charging power.

16. The apparatus of claim 14, wherein:
means for receiving wireless charging power along the wireless charging path comprises:
  a coil configured to receive wireless charging power;
  a parallel tuning circuit configured to tune the coil;
  a decoupling rectifier configured to receive the wireless charging power from the coil, and to provide a second rectified output; and
  an output filter configured to filter the second rectified output and to provide a filtered output;
means for receiving wired charging power along the wired charging path comprises:

a first rectifier configured to receive wired charging power and to provide a first rectified output; and
a power-factor correction (PFC) module configured to receive the first rectified output from the electromagnetic interference (EMI) filter and rectifier, and further configured to provide a power-factor corrected output; and the combined charging path further comprises:
an isolated DC-DC converter configured to receive the power-factor corrected output, to receive the filtered output, and to provide an isolated DC output to the means for storing charging power.

17. The apparatus of claim 14, wherein:
means for receiving wireless charging power along the wireless charging path comprises:
a coil configured to receive wireless charging power;
a series tuning circuit configured to tune the coil; and
a decoupling rectifier configured to receive the wireless charging power from the coil, and to provide a second rectified output;

means for receiving wired charging power along the wired charging path comprises:
a first rectifier configured to receive wired charging power and to provide a first rectified output; and
a power-factor correction (PFC) module configured to receive the first rectified output from the electromagnetic interference (EMI) filter and rectifier, and further configured to provide a power-factor corrected output; and the combined charging path further comprises:
an isolated DC-DC converter configured to receive the power-factor corrected output, to receive the second rectified output, and to provide an isolated DC output to the means for storing charging power.

18. The apparatus of claim 14, wherein:
means for receiving wireless charging power along the wireless charging path comprises:
a coil configured to receive wireless charging power; and
a parallel and partial series tuning circuit configured to tune the coil;

the combined charging path further comprises:
a first rectifier configured to receive wired charging power through a wired connection, to receive the wireless charging power from the coil, and to provide a first rectified output;
a power-factor correction (PFC) module configured to receive the first rectified output from the electromagnetic interference (EMI) filter and rectifier, and further configured to provide a power-factor corrected output; and
an isolated DC-DC converter configured to receive the power-factor corrected output, to receive the second rectified output, and to provide an isolated DC output to the batter.

19. The apparatus of claim 14, wherein:
means for receiving wireless charging power along the wireless charging path comprises:
a coil configured to receive wireless charging power;
a decoupling rectifier configured to receive the wireless charging power from the coil, and to provide a second rectified output; and
a wave-shaping controller configured to shape the second rectified output and to provide a wave-shaped output;

means for receiving wired charging power along the wired charging path comprises:

a first rectifier configured to receive wired charging power and to provide a first rectified output; and
a power-factor correction (PFC) module configured to receive the first rectified output from the electromagnetic interference (EMI) filter and rectifier, and further configured to provide a power-factor corrected output; and the combined charging path further comprises:
an isolated DC-DC converter configured to receive the power-factor corrected output, to receive the wave-shaped output, and to provide an isolated DC output to the means for storing charging power.

20. The apparatus of claim 14, wherein:
means for receiving wireless charging power along the wireless charging path comprises:
a coil configured to receive wireless charging power;
a parallel tuning circuit configured to tune the coil; and
a decoupling rectifier configured to receive the wireless charging power from the coil, and to provide a second rectified output;

means for receiving wired charging power along the wired charging path comprises:
a first rectifier configured to receive wired charging power and to provide a first rectified output; and the combined charging path further comprises:
a dual-mode power-factor correction (PFC) and wave-shaping module configured to receive the first rectified output and the second rectified output, and further configured to provide a power-factor corrected output; and
an isolated DC-DC converter configured to receive the power-factor corrected output, to receive the wave-shaped output, and to provide an isolated DC output to the means for storing charging power.

21. The apparatus of claim 14, wherein:
means for receiving wireless charging power along the wireless charging path comprises:
a coil configured to receive wireless charging power;
a series tuning circuit configured to tune the coil; and
a decoupling rectifier configured to receive the wireless charging power from the coil, and to provide a second rectified output;

means for receiving wired charging power along the wired charging path comprises:
a first rectifier configured to receive wired charging power and to provide a first rectified output; and the combined charging path further comprises:
a power-factor correction (PFC) module configured to receive the first rectified output and the second rectified output, and further configured to provide a power-factor corrected output;
an isolated DC-DC converter configured to receive the power-factor corrected output, to receive the wave-shaped output, and to provide an isolated DC output to the means for storing charging power.

22. The apparatus of claim 14, wherein:
means for receiving wireless charging power along the wireless charging path comprises:
a coil configured to receive wireless charging power; and
a series tuning circuit configured to tune the coil; and the combined charging path further comprises:
a rectifier configured to receive wired charging power from a wired connection, to receive the wireless charging power from the coil, and to provide a first rectified output;

a power-factor correction (PFC) module configured to receive the first rectified output, and further configured to provide a power-factor corrected output; and an isolated DC-DC converter configured to receive the power-factor corrected output, to receive the wave-shaped output, and to provide an isolated DC output to the means for storing charging power.

23. The apparatus of claim 14, wherein:

means for receiving wireless charging power along the wireless charging path comprises:

a coil configured to receive wireless charging power; and a parallel and partial series tuning circuit configured to tune the coil; and the combined charging path further comprises:

a rectifier configured to receive wired charging power from a wired connection, to receive the wireless charging power from the coil, and to provide a first rectified output;

a dual-mode power-factor correction (PFC) and wave-shaping module configured to receive the first rectified output, and further configured to provide a power-factor corrected output; and an isolated DC-DC converter configured to receive the power-factor corrected output, to receive the wave-shaped output, and to provide an isolated DC output to the means for storing charging power.

24. The apparatus of claim 14, wherein:

means for receiving wireless charging power along the wireless charging path comprises:

a coil configured to receive wireless charging power; and a series tuning circuit configured to tune the coil;

means for receiving wired charging power along the wired charging path comprises:

a first rectifier configured to receive wired charging power and to provide a first rectified output; and an isolated DC-DC converter configured to receive the first rectified output, and to provide an isolated DC output; and the combined charging path further comprises:

a second rectifier configured to receive the wireless charging power from the coil, to receive the isolated DC output, and to provide a second rectified output; and a current-source power-factor correction (PFC) module configured to receive the second rectified output, and further configured to provide a current-source output to the means for storing charging power.

25. The apparatus of claim 14, wherein the wireless charging power comprises a modulated amplitude.

26. The apparatus of claim 14, further comprising one or more of: a parallel tuning circuit configured to tune the coil, an electromagnetic interference (EMI) filter configured to filter the wired charging power, a bulk capacitance configured to filter a power-factor corrected output, and an output filter configured to filter a rectified output.

* * * * *